(12) United States Patent
Waltermann et al.

(10) Patent No.: US 12,309,137 B2
(45) Date of Patent: May 20, 2025

(54) ADDING DEVICES TO A NETWORK VIA A ZERO-KNOWLEDGE PROTOCOL

(71) Applicant: Lenovo (United States) Inc., Morrisville, NC (US)

(72) Inventors: Rod D. Waltermann, Rougemont, NC (US); Igor Stolbikov, Apex, NC (US); Ratan Ray, Cary, NC (US); Alfredo Zugasti, Cary, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 328 days.

(21) Appl. No.: 17/709,882

(22) Filed: Mar. 31, 2022

(65) Prior Publication Data

US 2023/0319026 A1 Oct. 5, 2023

(51) Int. Cl.
*H04L 9/40* (2022.01)
*G06F 15/16* (2006.01)
*H04L 15/16* (2006.01)

(52) U.S. Cl.
CPC ................ *H04L 63/0823* (2013.01)

(58) Field of Classification Search
CPC ................................... H04L 63/0823
USPC ........................................... 726/3
See application file for complete search history.

(56) References Cited

U.S. PATENT DOCUMENTS

| | | | |
|---|---|---|---|
| 11,907,874 B2* | 2/2024 | Willardson | G06Q 10/063112 |
| 2003/0053629 A1* | 3/2003 | Knapen | H04L 9/0844 |
| | | | 380/277 |
| 2013/0238897 A1* | 9/2013 | Mashatan | H04L 9/3268 |
| | | | 713/158 |
| 2013/0276084 A1* | 10/2013 | Canard | H04L 9/3218 |
| | | | 726/7 |
| 2017/0180356 A1* | 6/2017 | Sherman | H04L 9/3271 |
| 2018/0278420 A1* | 9/2018 | Sherman | H04L 9/3218 |
| 2020/0076829 A1* | 3/2020 | Wentz | H04L 63/0823 |
| 2020/0084195 A1* | 3/2020 | Levy | H04L 63/0823 |
| 2020/0162268 A1* | 5/2020 | Wentz | H04L 9/3239 |
| 2020/0186355 A1* | 6/2020 | Davies | H04L 63/123 |
| 2020/0241929 A1* | 7/2020 | Arrasjid | H04L 43/08 |

(Continued)

FOREIGN PATENT DOCUMENTS

WO WO-2023110551 A1 * 6/2023 ........... H04L 9/0866

OTHER PUBLICATIONS

"MQTT Version 5.0 Oasis Standard", Oasis, https://docs.oasis-open.org/mqtt/mqtt/v5.0/os/mqtt-v5.0-os.html#_Toc3901256, Mar. 7, 2019, pp. 1-117.

*Primary Examiner* — Zi Ye
*Assistant Examiner* — Berhanu Shitayewoldetadik
(74) *Attorney, Agent, or Firm* — Kunzler Bean & Adamson

(57) ABSTRACT

Methods, apparatus, and computer program products for adding devices to a network via a zero-knowledge protocol are disclosed. One method includes implementing, by a processor, a zero-knowledge protocol configured to establish digital trust relationships between the processor and computing devices attempting to join a network and adding each computing device to the network that successfully establishes a respective digital trust relationship with the processor via the zero-knowledge protocol. Apparatus and computer program products that include hardware and/or software that can perform the methods for adding devices to a network via a zero-knowledge protocol are also disclosed herein.

20 Claims, 12 Drawing Sheets

(56) References Cited

U.S. PATENT DOCUMENTS

| | | | |
|---|---|---|---|
| 2020/0296128 A1* | 9/2020 | Wentz | H04L 63/1433 |
| 2021/0044968 A1* | 2/2021 | Robert | H04L 63/0861 |
| 2021/0184864 A1* | 6/2021 | Wentz | H04L 9/3218 |
| 2022/0158835 A1* | 5/2022 | Vedeshwar | H04L 9/0866 |
| 2022/0294612 A1* | 9/2022 | Chmora | H04L 9/08 |
| 2023/0308287 A1* | 9/2023 | Pettit | H04L 9/50 |

* cited by examiner

ADDING DEVICES TO A NETWORK VIA A ZERO-KNOWLEDGE PROTOCOL

FIELD

The subject matter disclosed herein relates to computing networks and more particularly relates to adding devices to a network via a zero-knowledge protocol.

BACKGROUND

Internet of Things (IoT) devices such as smart televisions, smart speakers, smart appliances, and/or the like may generally be connected to one another over a network such as a home network, an office network, etc. However, sharing content between IoT devices may require a user to manually select a device to share content to, which may be difficult if the desired IoT device does not have an easy way to securely identify itself. Furthermore, building up a trust relationship with a device attempting to join a network is an important task because data is typically openly broadcast between the network and the device attempting to join the network, which exposes the data being broadcast to sniffing, alteration, and/or manipulation by unauthorized third parties.

BRIEF SUMMARY

Apparatus, methods, and computer program products that can add devices to a network via a zero-knowledge protocol are disclosed. One apparatus includes a processor and a memory configured to store code executable by the processor. The code, when executed by the processor, causes the processor to implement a zero-knowledge protocol configured to establish digital trust relationships between the processor and computing devices attempting to join a network and add each computing device to the network that successfully establishes a respective digital trust relationship with the processor via the zero-knowledge protocol.

A method for adding devices to a network via a zero-knowledge protocol includes implementing, by a processor, a zero-knowledge protocol configured to establish digital trust relationships between the processor and computing devices attempting to join a network. The method further includes adding each computing device to the network that successfully establishes a respective digital trust relationship with the processor via the zero-knowledge protocol.

A computer program product for adding devices to a network via a zero-knowledge protocol includes a computer-readable storage device including code embodied therewith. The code is executable by a processor to cause the processor to implement a zero-knowledge protocol configured to establish digital trust relationships between the processor and computing devices attempting to join a network and add each computing device to the network that successfully establishes a respective digital trust relationship with the processor via the zero-knowledge protocol.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
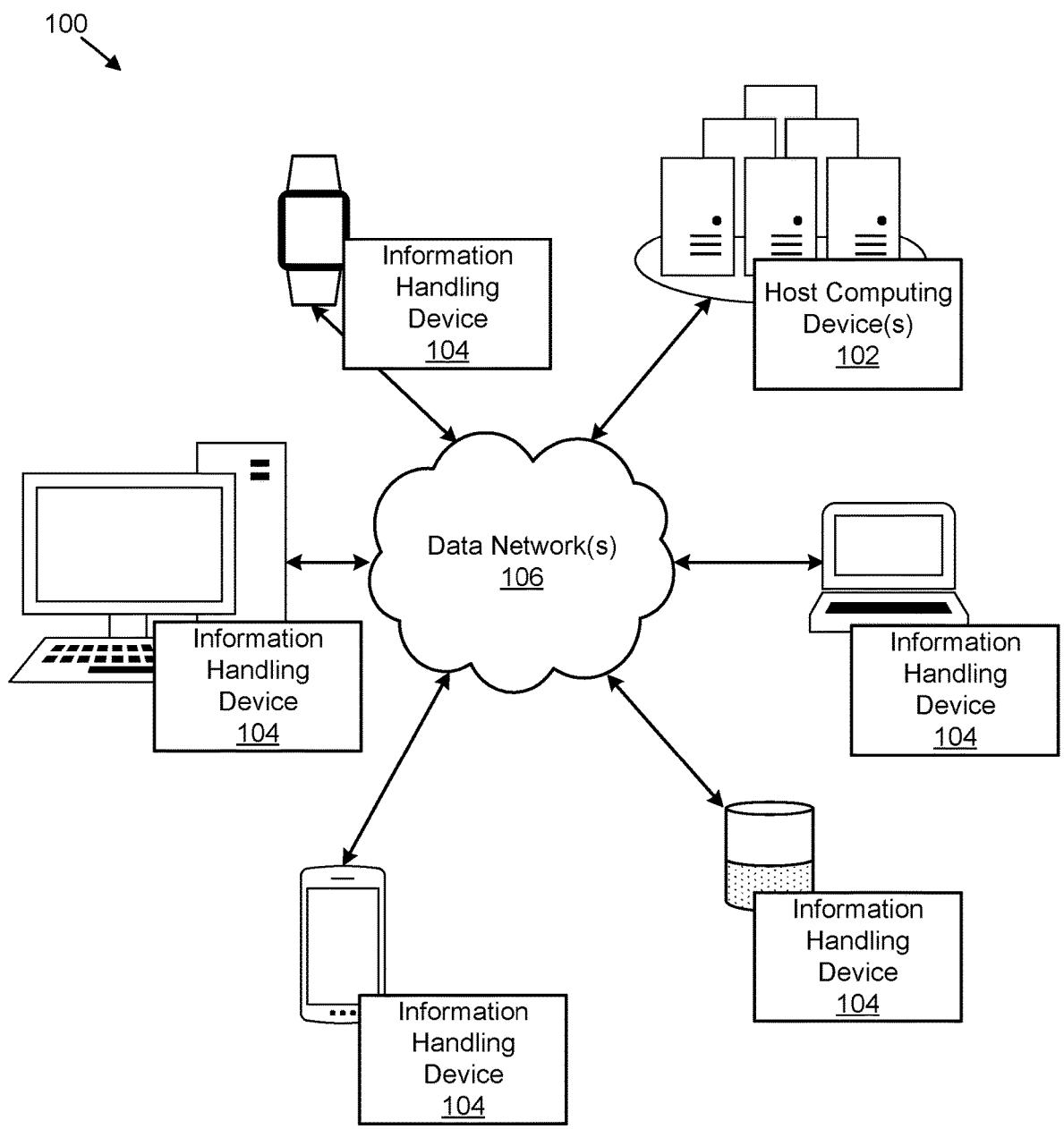
FIG. 1 is a schematic block diagram illustrating one embodiment of a network for adding devices to the network via a zero-knowledge protocol.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/ acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Apparatus, methods, and program products that can add devices to a network via a zero-knowledge protocol are disclosed herein. One apparatus includes a processor and a memory configured to store code executable by the processor. The code, when executed by the processor, causes the processor to implement a zero-knowledge protocol configured to establish digital trust relationships between the processor and computing devices attempting to join a network and add each computing device to the network that successfully establishes a respective digital trust relationship with the processor via the zero-knowledge protocol.

A method for adding devices to a network via a zero-knowledge protocol includes implementing, by a processor, a zero-knowledge protocol configured to establish digital trust relationships between the processor and computing devices attempting to join a network. The method further includes adding each computing device to the network that successfully establishes a respective digital trust relationship with the processor via the zero-knowledge protocol.

A computer program product for adding devices to a network via a zero-knowledge protocol includes a computer-readable storage device including code embodied therewith. The code is executable by a processor to cause the processor to implement a zero-knowledge protocol configured to establish digital trust relationships between the processor and computing devices attempting to join a network and add each computing device to the network that successfully establishes a respective digital trust relationship with the processor via the zero-knowledge protocol.

Turning now to the drawings, FIG. 1 is a schematic block diagram illustrating one embodiment of a network 100 (or system 100) for adding devices to the network 100 (or system 100) via a zero-knowledge protocol. The network 100 may include any suitable network and/or type of network that is known or developed in the future. Examples of a network 100 include, but are not limited to, a mesh network, a communication network, a local network, a WIFI network (e.g., WIFI 6, etc.), and a thread network, etc., among other networks and/or types of networks that are possible and contemplated herein.

In one embodiment, the network 100 is established by a set of host computing devices 102 (or host computing device(s) 102) adding one or more information handling devices 104 to the network 100 over one or more data networks 106. In certain embodiments, even though a specific quantity of host computing devices 102, information handling devices 104, and/or data networks 106 are depicted in FIG. 1, one of skill in the art will recognize, in light of this disclosure, that any quantity of host computing devices 102, information handling devices 104, and/or data networks 106 may be included in the network 100.

A host computing device 104 may include any suitable hardware and/or software capable of adding one or more information handling devices 104 to the network 100. In various embodiments, a host computing device 102 is configured to add information handling devices 102 (e.g., one or more members) to the network 100 (e.g., a mesh network) by leveraging a zero-knowledge protocol.

In some embodiments, a host computing device 102 utilizes zero-knowledge data to generate a digital certificate (e.g., a new and/or additional x.509 certificate) for each information handling device 104 attempting to join the network 100. By generating a new digital certificate for each information handling device 104 attempting to join the network 100, an information handling device 104 is not required to have a digital certificate prior to attempting to join the network 100. In other words, prior to attempting to join the network 100, an information handling device 104 may not include a pre-existing digital certificate (e.g., an x.509 certificate) embedded in the firmware of the information handling device 102. Since at least some contemporary information handling devices 104 include a pre-existing digital certificate with a firmware embedded expiration date, the various embodiments of a host computing device 102 can add an information handling device 104 to the network 100 that might otherwise be rendered obsolete by the firmware embedded expiration date of the digital certificate. That is, various embodiments of a host computing device 102 can add one or more information handling devices 104 to the network 100 that include(s) an expired digital certificate (e.g., an expired x.509 certificate), which can include a digital certificate that is embedded in the firmware of an information handling device 104.

In addition, at least some contemporary networks are unsecure and/or define an unsecure area. These contemporary networks are unsecure and/or define an unsecure area because there can be unauthorized "listeners" and/or other bad actors that have the potential capability of accessing the data being exchanged between the devices in a contemporary network. The various embodiments of a network 100 and/or host computing device 102 disclosed herein can allow and/or enable an information handling device 104 to build up a digital trust relationship with the host computing device 102 via a zero-knowledge protocol. Here, implementing a zero-knowledge protocol can reduce the amount of data that is exchanged between the host computing device 102 and an information handling device 104 attempting to join the network 100.

In some embodiments, a digital trust relationship can be established between the host computing device 102 and an information handling device 104 with a minimal amount of common knowledge data, a predefined amount of common knowledge data, and/or a predetermined amount of common knowledge data being exchanged between the host computing device 102 and the information handling device 104. Further, various embodiments of the network 100 and/or the host computing device 102 includes a host computing device 102 configured to establish a respective digital trust relationship and each respective information handling device 104 attempting to join the network 100 with the minimal amount of common knowledge data, the predefined amount of common knowledge data, and/or the predetermined amount of common knowledge data being exchanged between the host computing device 102 and each respective information handling device 104. Since the amount of data being exchanged between the host computing device 102 and an information handling device 104 is minimized, predefined, and/or predetermined, the various embodiments disclosed herein can limit and/or at least reduce the amount of data that is exposed on the network 100 and/or capable of being accessed by one or more unauthorized parties, which can define a secure network 100 or at least a network 100 that is more secure than contemporary networks.

Figure 2A:
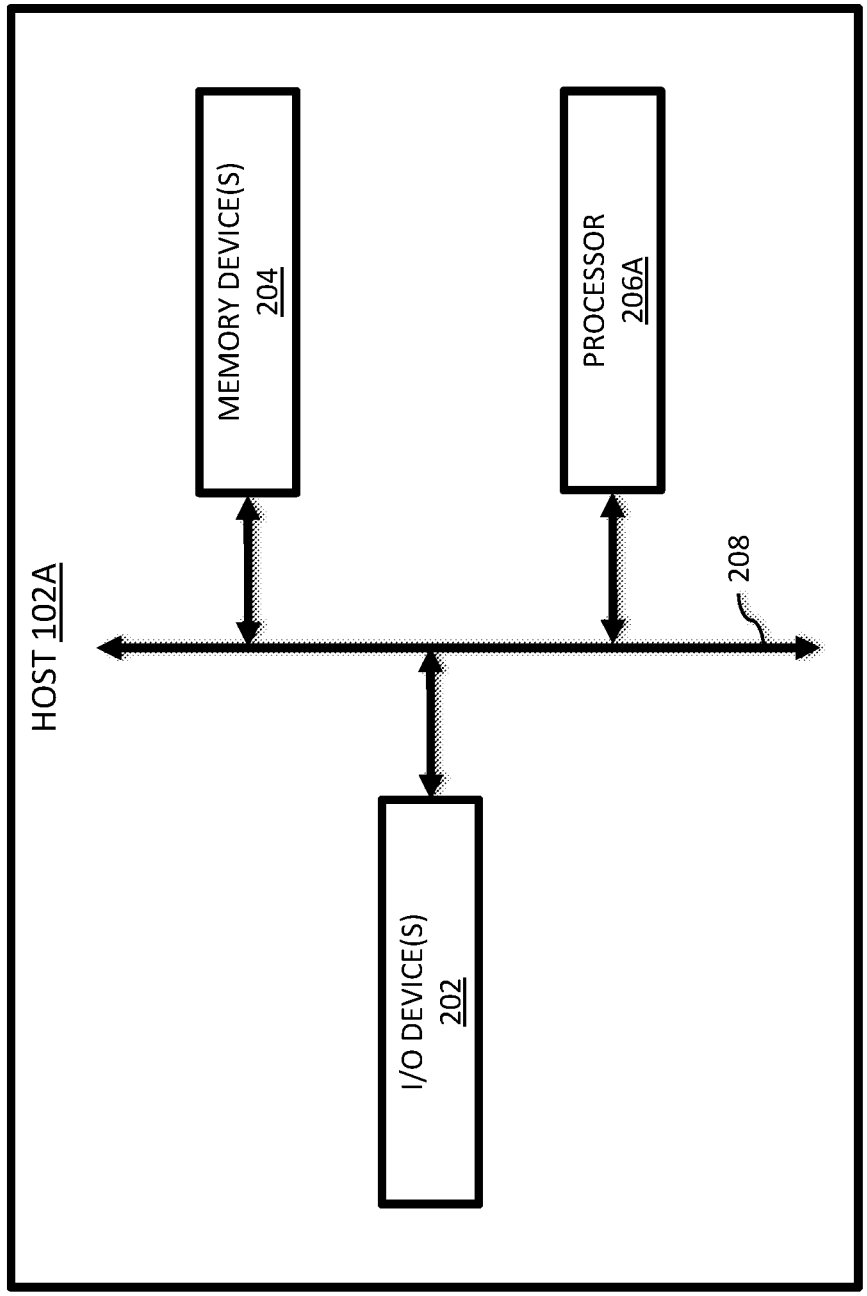
FIGS. 2A and 2B are schematic block diagrams illustrating various embodiments of a host computing device included in the network of FIG. 1.

With reference to FIG. 2A, FIG. 2A is a block diagram of one embodiment of a host computing device 102A. At least in the illustrated embodiment, the host computing device 102A includes, among other components and/or features, one or more input/out (I/O) devices 202, a set of memory devices 204 (or simply, memory 204), and a processor 206A coupled to and/or in communication with one another via a bus 208 (e.g., a wired and/or wireless bus).

Figure 2B:
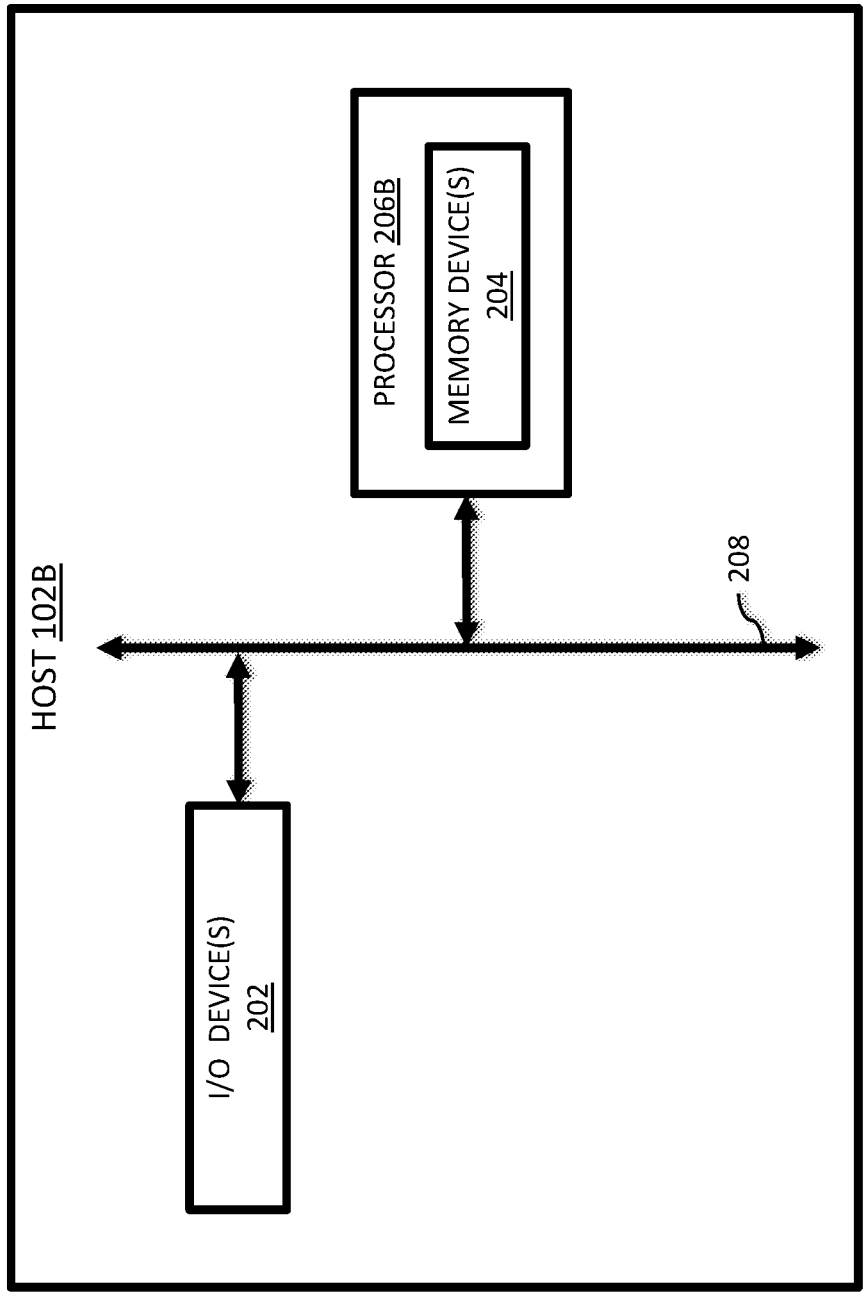

Referring to FIG. 2B, FIG. 2B is a block diagram of another embodiment of a host computing device 102B. At least in the illustrated embodiment, the host computing device 102B includes, among other components and/or features, one or more I/O devices 202, a set of memory devices 204, and a processor 206B coupled to and/or in communication with one another via a bus 208 similar to the I/O device(s) 202, memory device(s) 204, processor 206A, and bus 208 included in the host computing device 102A illustrated in FIG. 2A. A difference between the host computing device 102B and the host computing device 102A is that the memory device(s) 204 of the host computing device 102B are included in and/or form a portion of the processor 206B, whereas the memory device(s) 204 of the host computing device 102A are separate from and/or are device(s) that is/are independent from the processor 206A.

The host computing device 102A and the host computing device 102B may simply be referred to herein, individually and/or collectively, as host computing device(s) 102. In addition, the processor 206A and the processor 206B may simply be referred to herein, individually and/or collectively, as processor(s) 206.

In FIGS. 2A and 2B, an I/O device 202 may include any suitable system and/or device that is known or developed in the future capable of receiving inputs and transmitting outputs. That is, an I/O device 202 may include any suitable hardware and/or software that can enable and/or allow the host computing device 102 to communicate with one or more external computing devices over a communication network. In various embodiments, the I/O device 202 is configured to enable the host computing device 102 to communicate (e.g., transmit/receive data (exchange data), transmit/receive requests, and/or transmit/receive commands, etc.) with one or more information handling devices 104 over one or more data networks 106.

A set of memory devices 204 may include any suitable quantity of memory devices 204. Further, a memory device 204 may include any suitable type of device and/or system that is known or developed in the future that can store computer-useable and/or computer-readable code. In various embodiments, a memory device 204 may include one or more non-transitory computer-usable mediums (e.g., readable, writable, etc.), which may include any non-transitory and/or persistent apparatus or device that can contain, store, communicate, propagate, and/or transport applications, instructions, data, computer programs, software, code, routines, etc., for processing by or in connection with a computer processing device (e.g., processor 206A and/or processor 206B).

A memory device 204, in some embodiments, includes volatile computer storage media. For example, a memory device 204 may include random access memory (RAM), including dynamic RAM (DRAM), synchronous dynamic RAM (SDRAM), and/or static RAM (SRAM). In other embodiments, a memory device 204 includes non-volatile computer storage media. For example, a memory device 204 may include flash memory and/or any other suitable non-volatile computer storage device that is known or developed in the future. In various embodiments, a memory device 204 includes both volatile and non-volatile computer storage media.

Figure 3:
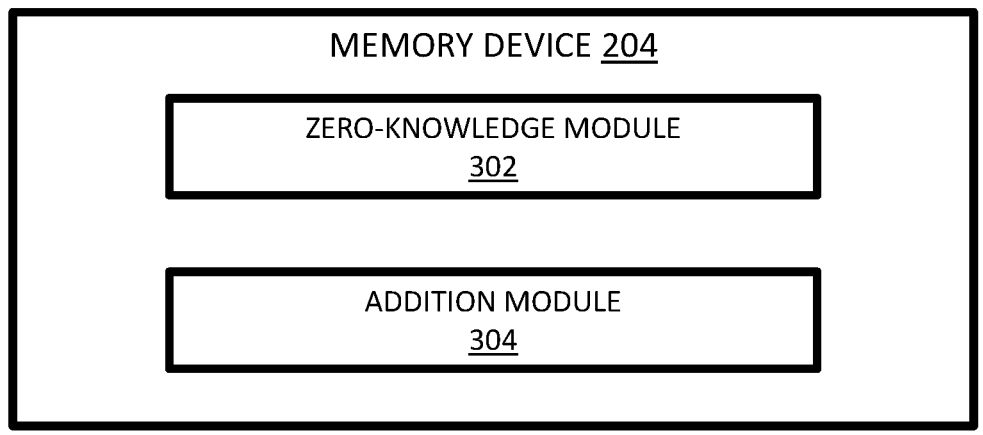
FIG. 3 is a schematic block diagram illustrating one embodiment of a memory device included in the host computing devices of FIGS. 2A and 2B.

With reference now to FIG. 3, FIG. 3 is a schematic block diagram of one embodiment of a memory device 204. At least in the illustrated embodiment, the memory device 204 includes, among other components and/or features, a zero-knowledge module 302 and an addition module 304 that are each configured to operate/function in conjunction with one another when executed by a processor 206 to add devices to a network via a zero-knowledge protocol.

Specifically, when executed by a processor 206, the zero-knowledge module 302 and the addition module 304 can operate/function in conjunction with one another to add one or more information handling devices 104 to the network 100 via a zero-knowledge protocol. In various embodiments, the zero-knowledge protocol enables and/or allows the addition of the information handling device(s) 104 to the network 100 via a minimal amount of data, a predefined amount of data, and/or a predetermined amount of data exchanged between the processor 206 and each respective information handling device 104 attempting to join the network 100, which can define a secure network 100, a more secure network 100, and/or a relatively more secure network 100, as discussed elsewhere herein.

A zero-knowledge module 302 may include any suitable hardware and/or software that can establish a digital trust relationship via a zero-knowledge protocol. In various embodiments, the zero-knowledge module 302 is configured to utilize a zero-knowledge protocol to establish a digital trust relationship between a host computing device 102 and/or a processor 206 and one or more information handling devices 104 (e.g., one or more computing devices) attempting to join the network 100. In certain embodiments, the zero-knowledge module 302 is configured to utilize the zero-knowledge protocol to establish a respective digital trust relationship between the host computing device 102 and/or the processor 206 and each respective information handling device 104 (e.g., each respective computing device) attempting to join the network 100.

The zero-knowledge protocol, in various embodiments, includes and/or is based on a password-authenticated key agreement protocol. In some embodiments, the password-authenticated key agreement protocol includes and/or is based on a Password Authenticated Key Exchange by Juggling (J-PAKE) protocol.

Figure 4:
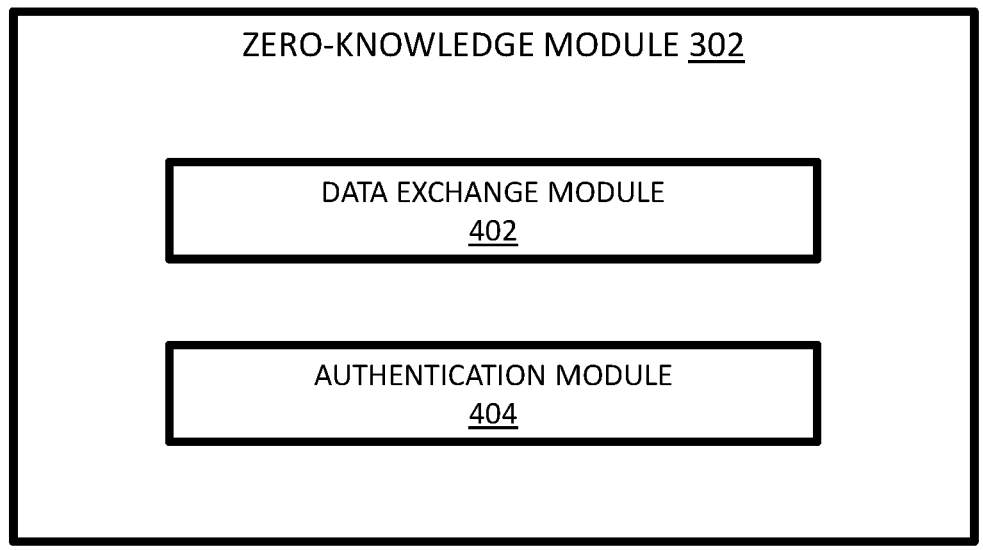
FIG. 4 is a schematic block diagram illustrating one embodiment of a zero-knowledge module included in the memory device of FIG. 3.

Referring to FIG. 4, FIG. 4 is a block diagram of one embodiment of a zero-knowledge module 302. At least in the embodiment illustrated in FIG. 4, the zero-knowledge module 302 includes, among other components and/or features, a data exchange module 402 and an authentication module 404 that are each configured to operate/function in conjunction with one another when executed by a processor 206 to establish a digital trust relationship between a host computing device 102 and/or a processor 206 and one or more information handling devices 104 (e.g., one or more computing devices, IoT devices, etc.) attempting to join the network 100. In certain embodiments, the operations and/or functions of the data exchange module 402 and/or the authentication module 404 can define a zero-knowledge protocol.

A data exchange module 402 may include any suitable hardware and/or software that can facilitate the exchange of data between a host computing device 102 and/or processor 206 and one or more information handling devices 104 attempting to join the network 100. In various embodiments, the data exchange module 402 is configured to facilitate the receipt of requests to join the network 100 and/or mutual authentication data from information handling devices 104 attempting to join the network 100. The data exchange module 402 is further configured to facilitate transmitting responses to the requests to join the network 100 and/or mutual authentication data to the information handling device(s) 104 that is/are attempting to join the network 100.

A request to join the network 100 received by the data exchange module 402 (e.g., host computing device 102 and/or processor 206) from an information handling device 104 attempting to join the network 100, in various embodiments, includes an identifier of the information handling device 104 attempting to join the network 100 (e.g., a device ID), a first pair of public encryption keys (e.g., a first public encryption key and a second public encryption key (or simply, a first pair of public keys, a first public key, and/or a second public key), and a first pair of zero-knowledge proofs (ZKPs) corresponding to the first pair of public keys (e.g., proofs of the private encryption keys or private keys corresponding to the first public key and the second public key), etc., among other data that is possible and contemplated herein.

The device ID may include any suitable identifier and/or type of identifier known in the art or developed in the future capable of uniquely representing an information handling device 104. In some embodiments, the device ID includes a numeric identifier, an alphabetical identifier, and/or an alphanumeric identifier, etc., among other identifiers and/or types of identifiers that are possible and contemplated herein, which can be in the form of a simple string representing the information handling device 104. In further embodiments, the device ID can include a unique non-confidential identity of the information handling device 104.

The first pair of public keys in a request received from an information handling device 104 may include any suitable public key(s) and/or type(s) of public key that is/are known or developed in the future. In various embodiments, the first and second public keys are generated based on a group G of an elliptic cryptography curve (ECC) with a generator "g" of a prime order "q," in which the ECC includes a difficult and/or complex discrete log problem. In certain embodiments, the group G includes a Schnorr group, among other groups and/or types of groups that are possible and contemplated herein.

As discussed herein, a first public key in the first pair of public keys can be represented by, for example, $g^{x1}$ and a second public key in the first pair of public keys can be represented by, for example, $g^{x2}$ such that the first pair of public keys can be represented as, $g^{x1}$, $g^{x2}$. In various embodiments, the public keys $g^{x1}$, $g^{x2}$ are randomly selected points on an ECC (e.g., random ECC points) such that public key $g^{x1}$ is a first random ECC point and $g^{x2}$ is a second random ECC point.

The ZKPs for the first pair of public keys in the request may include any suitable ZKP(s) and/or type(s) of ZKP that is/are known or developed in the future. In certain embodiments, each ZKP in the first pair of ZKPs corresponding to the first pair of public keys $g^{x1}$, $g^{x2}$ are Schnorr Zero-Knowledge Proofs.

As discussed herein, a first Schnorr ZKP in the first pair of ZKPs corresponding to the first public key $g^{x1}$ can be represented by, for example, ZKP (X1) and a second Schnorr ZKP in the first pair of ZKPs corresponding to the second public key $g^{x2}$ can be represented by, for example, ZKP (X2), such that the first pair of Schnorr ZKPs can be represented as, ZKP (X1) and ZKP (X2). The first pair of ZKPs (ZKP (X1), ZKP (X2)) can notify the host computing device 102 and/or processor 206 that the information handling device 104 knows the respective values of the first pair of public keys ($g^{x1}$, $g^{x2}$), which can be randomly selected values.

The first pair of ZKPs, in various embodiments, includes a secret, which can include any suitable secret that is known or developed in the future. In certain embodiments the secret can include a time property t, a value property s, or both time t and value s. As discussed herein, the secret can be represented as, S, and may include time t and/or value s.

The time t may include any suitable time property and/or time value that is known or developed in the future. In some embodiments, the time s includes a timestamp, among other time properties and/or time values that are possible and contemplated herein.

The value s may include any suitable value property and/or value that is known or developed in the future (e.g., a personal identification number (PIN), a bar code, a QR code, etc.). In some embodiments, the value s includes an integer in the range from 1 to n−1. In certain embodiments, n is a large prime number or a relatively large prime number, among other values that are possible and contemplated herein.

In various embodiments, the secret S includes a variable length character string using a subset of internationally recognized characters from the UTF-8 character set that includes a non-zero value (e.g., n≠0). In certain embodiments, the secret calculation is defined as, S=int(<secret>) mod n, in which the <secret> includes the value for time t and/or the value s.

The data exchange module 402, in various embodiments, is configured to transmit the data in the requests to join the network received from the information handling device 104 to the authentication module 404. That is, the data exchange module 402 is configured to transmit the device ID of the information handling device 104 attempting to join the network 100, the first pair of public keys ($g^{x1}$, $g^{x2}$), and the first pair of ZKPs (ZKP (X1), ZKP (X2)), etc. received from the information handling device 104 attempting to join the network 100 to the authentication module 404.

An authentication module 404 may include any suitable hardware and/or software that can authenticate an information handling device 104 attempting to join the network 100. In various embodiments, the information handling device 104 attempting to join the network 100 is authenticated via successfully establishing a digital trust relationship via a zero-knowledge protocol. The operations and/or functions of the authentication module 404 can define a zero-knowledge protocol or at least a portion of a zero-knowledge protocol.

The authentication module 404, in various embodiments, is configured to generate and transmit a response to an information handling device 104 attempting to join the network 100 in response to a request to join the network 100 received from an information handling device 104 attempting to join the network 100. A response may include any suitable data that can be utilized to establish a digital trust relationship between a host computing device 102 and/or a processor 206 and an information handling device 104 attempting to join the network 100 via a zero-knowledge protocol. In various embodiments, a response includes at least an identifier of the network 100, a second pair of public keys (e.g., third and fourth public keys), and a second pair of ZKPs corresponding to the second pair of public keys, among other data and/or features that can be utilized to establish a digital trust relationship between a host computing device 102 and/or a processor 206 and an information handling device 104 attempting to join the network 100 via a zero-knowledge protocol that are possible and contemplated herein.

An authentication module 404, in certain embodiments, is configured to store the identifier of the network 100 and/or one or more portions of the identifier of the network 100 for inclusion in a response to a request to join the network 100 received from an information handling device 104 attempting to join the network 100. In other embodiments, the identifier of the network 100 or one or more portions of the identifier of the network 100 are store in one or more other areas of memory 204 and the authentication module 404 is configured to retrieve the identifier of the network 100 or the portion(s) of the identifier of the network 100 from memory 404 for inclusion in a response to a request to join the network 100 received from an information handling device 104 attempting to join the network 100.

An identifier of the network 100 may include any suitable identifier and/or type of identifier known in the art or developed in the future capable of uniquely representing the network 100. In other words, the identifier of the network 100 may include any suitable identifier and/or type of identifier known in the art or developed in the future capable of uniquely representing the network 100, one or more portions of the network 100, one or more devices of the network 100, and/or one or more applications of the network 100, etc., among other identifiers that are possible and contemplated herein. For example, the identifier for the network 100 can include one or more device identifiers for the network 100 (e.g., device ID(s)), one or more group identifiers for the network 100 (e.g., group ID(s)), and/or one or more application identifiers for the network 100 (e.g., Application ID(s)), etc., among other identifiers and/or quantity of identifiers that can represent the network 100, portion(s) of the network 100, device(s), and/or application(s), etc. for the network 100 that are possible and contemplated herein.

Figure 5:
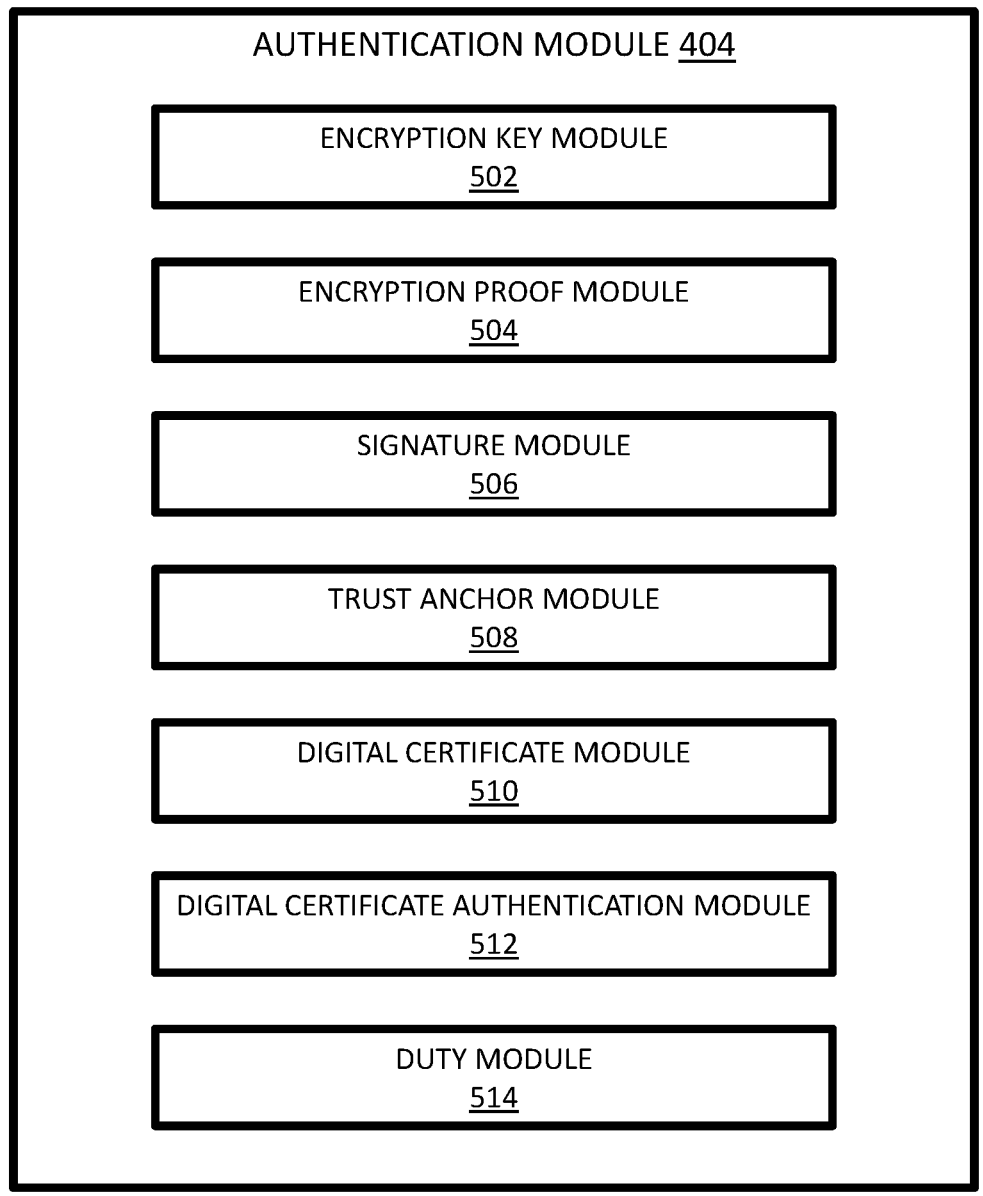
FIG. 5 is a schematic block diagram illustrating one embodiment of an authentication module included in the zero-knowledge module of FIG. 4.

Referring to FIG. 5, FIG. 5 is a block diagram of one embodiment of an authentication module 404. At least in the embodiment illustrated in FIG. 5, the authentication module 404 includes, among other components and/or features, an encryption key module 502, an encryption proof module 504, a signature module 506, a trust anchor module 508, a digital certificate module 510, a digital certificate authentication module 512, and a duty module 514.

An encryption key module 502 may include any suitable hardware and/or software that can generate one or more public encryption keys (or public keys) for inclusion in a response to a request to join the network 100. In various embodiments, the encryption key module 502 is configured to generate a pair of public keys (e.g., a second pair of public keys) for inclusion in a response to a request to join the network 100. That is, the encryption key module 502 is configured to generate a third public key and a fourth public key in response to receiving a request to join the network 100 from an information handling device 104 attempting to join the network 100.

The second pair of public keys (e.g., a third public key and a fourth public key) may include any suitable public key(s) and/or type(s) of public key that is/are known or developed in the future. As discussed herein, the third public key in the second pair of public keys can be represented by, for example, $g^{x3}$ and the fourth public key in the second pair of public keys can be represented by, for example, $g^{x4}$, such that the second pair of public keys can be represented as, $g^{x3}$, $g^{x4}$.

In various embodiments, the third and fourth public keys correspond to, are associated with, and/or are generated similar to the first and second public keys generated by and/or received in a request to join the network 100 received from an information handling device 104 attempting to join the network 100. That is, in some embodiments, the third and fourth public key are generated based on the group G of the ECC. In certain embodiments, the group G includes the generator "g" of a prime order "q," in which the ECC includes a difficult and/or complex discrete log problem. Recall that, in certain embodiments, the group G includes a Schnorr group, among other groups and/or types of groups that are possible and contemplated herein.

In various embodiments, the public keys $g^{x3}$, $g^{x4}$ are points on an ECC. In certain embodiments, each public key in the second pair of public keys $g^{x3}$, $g^{x4}$ is a randomly selected point on an ECC and/or random ECC point such that public key $g^{x3}$ is a third random ECC point and $g^{x4}$ is a fourth random ECC point.

The encryption key module 502 is configured to transmit the second pair of public keys generated by the encryption key module 502 to the encryption proof module 504. Further, the encryption proof module 504 is configured to receive the second pair of public keys from the encryption key module 502.

An encryption proof module 504 may include any suitable hardware and/or software that can generate one or more encryption proofs for inclusion in a response to a request to join the network 100. In various embodiments, the encryption proof module 504 is configured to generate a pair of encryption proofs (e.g., a second pair of encryption proofs) for inclusion in a response to a request to join the network 100. That is, the encryption proof module 504 is configured to generate a third encryption proof and a fourth encryption proof in response to receiving the second pair of public keys from the encryption key module 502.

The ZKPs generated for the third and fourth public keys may include any suitable ZKP and/or type of ZKP that is/are known or developed in the future. In various embodiments, the ZKPs generated for the third and fourth public keys include Schnorr Zero-Knowledge Proofs, among other ZKPs and/or types of ZKPs that are possible and contemplated herein.

In certain embodiments, the ZKPs in the second pair of ZKPs correspond to and/or a generated based on the second pair of public keys $g^{x3}$, $g^{x4}$ received from the encryption key module 502. In various embodiments, one or both of the ZKPs in the second pair of ZKPs can include a Schnorr Zero-Knowledge Proof of the public keys $g^{x3}$, $g^{x4}$.

As discussed herein, a third ZKP (e.g., a Schnorr ZKP) in the second pair of ZKPs corresponds to the third public key $g^{x3}$ and can be represented by, for example, ZKP (X3). Further, a fourth ZKP (e.g., a Schnorr ZKP) in the second pair of ZKPs corresponds to the fourth public key $g^{x4}$ can be represented by, for example, ZKP (X4), such that the second pair of ZKPs (e.g., a second pair of Schnorr ZKPs) can be represented as, (ZKP (X3), ZKP (X4)).

The second pair of ZKPs (e.g., ZKP (X3), ZKP (X4)) can notify the information handling device 104 that the host computing device 102 and/or processor 206 knows the respective values of the second pair of public keys ($g^{x3}$, $g^{x4}$) In various embodiments, the second pair of ZKPs (ZKP (X3), ZKP (X4)) can be generated from and/or based on the respective randomly selected values for the second pair of public keys $g^{x3}$, $g^{x4}$.

The second pair of ZKPs, in various embodiments, includes the secret S received from the information handling device 104. That is, the secret S can include the time t and/or value s and can at this point in time be considered a shared secret S.

The data exchange module 402, in various embodiments, is configured to transmit a response including data that can be utilized to establish a digital trust relationship between the host computing device 102 and/or processor 206 and the information handling device 104 attempting to join the network 104. That is, a request including the identifier of the network 100, the second pair of public keys (e.g., third and fourth public keys ($g^{x3}$, $g^{x4}$)), and the second pair of ZKPs (e.g., third and fourth ZKPs (ZKP (X3), ZKP (X4)), etc. to the information handling device 104 attempting to join the network 100.

The data exchange module 402, in various embodiments, is configured to receive authentication data (e.g., first authentication data) from the information handling device 104 attempting to join the network 100 subsequent to transmitting the response to the information handling device 104. The first authentication data may include any suitable data that can allow and/or enable the host computing device 102 and/or processor 206 to further establish a digital trust relationship with the information handling device 104 attempting to join the network 100.

In various embodiments, the first authentication data received from the information handling device 104 attempting to join the network 100 includes at least a first public encryption key generator (or first public key generator generator) and a fifth ZKP corresponding to the first public key generator. The first public key generator corresponds to and/or is based on the data included in the response transmitted to the information handling device 104 attempting to join the network 100 (e.g., the second pair of public keys, the second pair of ZKPs, and the secret S (e.g., time t and/or value s).

The first public key generator in the first authentication data received from an information handling device 104 may include any suitable public key and/or type of public key that is known or developed in the future. A first public key generator is generated based on the pairs of public keys, the pairs of ZKPs, and the secret exchanged between the information handling device 104 and the host computing device 102 and/or processor 206. The first public key generator is based on the first public key $g^{x1}$, the third public key $g^{x3}$, and the fourth public key $g^{x4}$. The first public key generator can be represented by, for example, $g^{(x1+x3+x4)}$, in which $g^{(x1+x3+x4)}$ is the key generator.

The fifth ZKP may include any suitable ZKP and/or type of ZKP that is known or developed in the future. In certain embodiments, the fifth ZKP is based on a private key (e.g., private key $g^{X2}$) associated with/corresponding to the second public key $g^{x2}$ and the secret included in the second pair of ZKPs that was previously generated by the host computing device 102 and/or processor 206.

As such, various embodiments of the first authentication data can be represented as, for example, $A = g^{(x1+x3+x4)x2S}$ in which $g^{(x1+x3+x4)}$ is the first public key generator and the fifth ZKP is the proof for the exponent x2S. As discussed herein, the fifth ZKP can be represented as, ZKP (X2S). In various embodiments, the data exchange module 402 is configured to transmit the first authentication data to the authentication module 404.

The authentication module 404 is further configured to generate second authentication data to mutually verify the information handling device 104 attempting to join the network 100. The second authentication data includes, among other data and/or features, a second public key generator, a sixth ZKP associated with and/or corresponding to the second public key generator, and the secret received from the information handling device 104.

The encryption key module 502 is further configured to generate the second public key generator, which can include any suitable public key and/or type of public key that is known or developed in the future. A second public key generator is generated based on the pairs of public keys, the pairs of ZKPs, and the secret exchanged between the information handling device 104 and the host computing device 102 and/or processor 206. The second public key generator is based on the first public key $g^{x1}$, the second public key $g^{x2}$, and the third public key $g^{x3}$. The second public key generator can be represented by, for example, $g^{(x1+x2+x3)}$, in which $g^{(x1+x2+x3)}$ is the key generator.

The encryption key module 502 is configured to transmit the second public key generator to the encryption proof module 504 for processing by the encryption proof module 504. The encryption proof module 504 is configured to receive and generate a sixth ZKP corresponding to the second public key generator.

The sixth ZKP may include any suitable ZKP and/or type of ZKP that is known or developed in the future. In certain embodiments, the sixth ZKP is based on a private key associated with/corresponding to the fourth public key $g^{x4}$ (e.g., private key $g^{X4}$) and the secret S included in the first pair of ZKPs that was previously received from the information handling device 104. In certain embodiments, the private key $g^{X4}$ can be generated as, $g^{X4} = x4*S \mod n$, in which S is the secret previously generated by and received from the information handling device 104.

In various embodiments, the encryption proof module 504 is configured to generate the sixth ZKP by assigning a random integer in the range 1 to n−1 to an ephemeral private key v. An ephemeral public key associated with an ephemeral private key v (e.g., $g^{X4}$) is generated and assigned to V in which V=G*v. An integer representation of a hash is generated and assigned to H. In some embodiments the hash H can be calculated as, H=int(SHA-256(G, V, X, ID, S)) mod n.

In various embodiments of the second authentication data can be represented as for example $B=g^{(x1+x2+x3)x4S}$ in which $g^{(x1+x2+x3)}$ is the second public key generator and the sixth ZKP is the proof for the exponent x4S. As discussed herein, the sixth ZKP can be represented as, ZKP (X4S).

In various embodiments, the data exchange module 402 is configured to transmit the second authentication data to the information handling device 104 and the signature module 506. The data exchange module 402 is also configured to receive a digital signature (e.g., a first digital signature r1) and/or a first public session key from the information handling device 104 and transmit the first digital signature r1 and/or first public session key to the signature module 506.

The signature module 506 is configured to receive the second authentication data and one or both of the first digital signature r1 and the second public session key. As discussed herein, the first digital signature r1 can be represented as, H(H(k)), and the second public session key can be represented as, k2.

A signature module 506 may include any suitable hardware and/or software that can generate digital signatures and/or verify digital signatures. In various embodiments, the signature module 506 is configured to generate a digital signature (e.g., a second digital signature r2) based on the second authentication data generated by the encryption key module 502 and the encryption proof module 504.

The second digital signature r2 may include any suitable digital signature that is known or developed in the future. In some embodiments, the second digital signature r2 includes a Schnorr signature, among other digital signatures and/or types of digital signature that are possible and contemplated herein.

The signature module 506, in various embodiments, is configured to compute second key material k2 as, $k2=(A/g^{x2x4s})x4=(g^{(x1+x3+x4)x2s}/g^{x2x4s})^{x4}=g^{(x1+x3)x2x4s}$. Further, the signature module 506 is configured to derive the second digital signature r2 using a cryptographic hash function K2=H(K), in which H(K) represents the second digital signature r2 and K2 represents the second public session key. In some embodiments, the second digital signature r2 can be calculated as, r2=v−x*H mod n.

In some embodiments, the signature module 506 can utilize the second digital signature r2 (e.g., H(K)) to verify a first digital signature H(H(K)) received from the information handling device 104 via determining whether H(K) and H(H(K)) match. That is, a match verifies the first digital signature and a non-match fails to verify the first digital signature. Further, the data exchange module 402 can transmit the second digital signature r2 (e.g., H(K)) to the information handling device 104 so that the information handling device 104 can similarly verify the host computing device 102 and/or processor 206, as discussed elsewhere herein.

Specifically, an integer representation of a hash is generated and assigned to H in which H=int(SHA-256(G, V, X4, ID, t,s)) mod n. A check point is generated and assigned to V in which V'=X4*h+G*r1. The points V' and V are compared. If the points V' and V are equal, the signature module 506 verifies the first digital signature r1. If the points V' and V are not equal, the signature module 506 fails to verify the first digital signature r1.

In additional or alternative embodiments, the signature module 506 can utilize the second public session key K2 to verify a first public session key K1 received from the information handling device 104 via determining whether the first public session key K1 and the second public session key K2 match. That is, a match verifies the first digital signature r1 and a non-match fails to verify the first digital signature r1. Further, the data exchange module 402 can transmit the second public session key K2 to the information handling device 104 so that the information handling device 104 can similarly verify the host computing device 102 and/or processor 206, as discussed elsewhere herein.

The signature module 506 is configured to reject a request to join the network 100 in response to failing to verify the first digital signature r1. Further, the data exchange module 402 is configured to transmit such rejection to join the network 100 to the information handling device 104.

In some embodiments, the signature module 506 is configured to transmit a verification notification to a trust anchor module 508 in response to verifying the first digital signature r1. Further, the trust anchor module 508 is configured to receive the verification notification from the signature module 506.

A trust anchor module 508 may include any suitable hardware and/or software that can perform the functions and/or operations of an authoritative entity in which trust is assumed and not derived. As such, the trust anchor module 508 can include any suitable trust anchor and/or type of trust anchor that is known or developed in the future.

The trust for the trust anchor module 508 may be established using any suitable process and/or technique that is known or developed in the future that can establish the trust anchor module 508 as a trust anchor. In certain embodiments, the trust anchor module 508 is configured generate a root certificate that establishes trust for the trust anchor module 508. That is, the root certificate can be the trust anchor from which a chain of trust between the information handling device 104 and the host computing device 102 and/or the processor 206 is established.

The trust anchor module 508 is configured to transmit (e.g., via the data exchange module 402) the trust anchor to the information handling device 104. The trust anchor module 508 is further configured to transmit the trust anchor to the digital certificate module 510 and the digital certificate module 510 is configured to receive the trust anchor.

A digital certificate module 510 may include any suitable hardware and/or software that can generate a digital certificate for an information handling device 104. In various embodiments, the digital certificate for an information handling device 104 generated by the digital certificate module 510 can include and/or define a new digital certificate and/or an additional digital certificate for an information handling device 104.

The digital certificate generated by the digital certificate module 510 may include any suitable digital certificate that is known or developed in the future that can authenticate and/or verify an information handling device 104. In certain embodiments, digital certificate generated by the digital certificate module 510 may include an x.509 digital certificate, among other digital certificates and/or types of digital certificates that are possible and contemplated herein.

In certain embodiments, the digital certificate module 510 is configured to transmit (e.g., via the data exchange module 402) the digital certificate (e.g., a new and/or additional digital certificate) to the information handling device 104. The digital certificate module 510 is further configured to transmit the trust the digital certificate to the digital certificate verification module 512.

The digital certificate verification module 512 is configured to receive the digital certificate from the digital certificate module 510. The digital certificate verification module 512 is further configured to receive (e.g., via the data exchange module 402) a digital certificate from an information handling device 104.

A digital certificate verification module 512 may include any suitable hardware and/or software that can verify and/or validate a digital certificate. In various embodiments, the digital certificate verification module 512 is configured to verify and/or validate digital certificates received from an information handling device 104.

The digital certificate verification module 512 can verify and/or validate a digital certificate using any suitable process and/or technique that is known or developed in the future. In some embodiments, the digital certificate verification module 512 is configured to verify and/or validate a digital certificate received from an information handling device 104 by comparing the digital certificate received from the information handling device 104 and the digital certificate received from the digital certificate module 510.

A digital certificate is verified and/or validated in response to the digital certificate received from the information handling device 104 matching the digital certificate received from the digital certificate module 510. Alternatively, digital certificate is not verified and/or not validated in response to the digital certificate received from the information handling device 104 not matching or failing to match the digital certificate received from the digital certificate module 510.

The digital certificate verification module 512 is configured to reject a request to join the network 100 in response to failing to verify and/or validate the digital signature received from the information handling device 104. Further, the data exchange module 402 is configured to transmit the rejection to join the network 100 to the information handling device 104.

In some embodiments, the digital certificate verification module 512 is configured to transmit a validation notification to an addition module 304 in response to verifying and/or validating the digital signature received from the information handling device 104. Further, the digital certificate verification module 512 is configured to transmit a validation notification to a duty module 514 in response to verifying and/or validating the digital signature received from the information handling device 104 and the duty module 514 is configured to receive the validation notification from the digital certificate verification module 512.

A duty module 514 may include any suitable hardware and/or software that can assign a role and/or duty to an information handling device 104 being added to a network 100. The assigned role and/or duty may include any suitable role and/or duty that is known or developed in the future capable of being performed by an information handling device 104 and/or included in a network 100. In various embodiments, the duty module 514 is configured to transmit (e.g., via the data exchange module 402) the assigned role and/or duty for an information handling device 104 being added to the network to an addition module 304.

With reference again to FIG. 3, an addition module 304 is configured to receive validation notifications from a digital certificate verification module 512. In further embodiments, the addition module 304 is configured to receive, from a duty module 514, the role and/or duty assigned to an information handling device 104 being added to the network 100.

An addition module 304 may include any suitable hardware and/or software that can add information handling devices 104 to a network 100. The addition module 304 may further include any suitable hardware and/or software that can implemented the role and/or duty assigned to an information handling device 104 added to the network 100.

The addition module 304 may add the information handling devices 104 to the network 100 using any suitable process and/or technique that is known or developed in the future capable of enabling and/or allowing an information handling device 104 to function/operate with the network 100. Further, the addition module 304 may implement the role and/or duty assigned to an information handling device 104 added to the network 100 using any suitable process and/or technique that is known or developed in the future capable of enabling and/or allowing an information handling device 104 to perform its assigned role and/or duty within the network 100. In this manner, the addition module 304 is configured to add each information handling device 104 to the network 100 that successfully establishes a respective digital trust relationship with the host computing device 102 and/or processor 206 via the zero-knowledge protocol.

Referring again to FIGS. 2A and 2B, a processor 206 may include any suitable non-volatile/persistent hardware and/or software configured to perform and/or facilitate performing functions and/or operations for adding devices to a network via a zero-knowledge protocol. In various embodiments, the processor 206 includes hardware and/or software for executing instructions in one or more modules and/or applications that can perform and/or facilitate adding devices to a network via a zero-knowledge protocol. The modules and/or applications executed by the processor 206 for adding devices to a network via a zero-knowledge protocol can be stored on and executed from a memory device 204 and/or from the processor 206.

Figure 6:
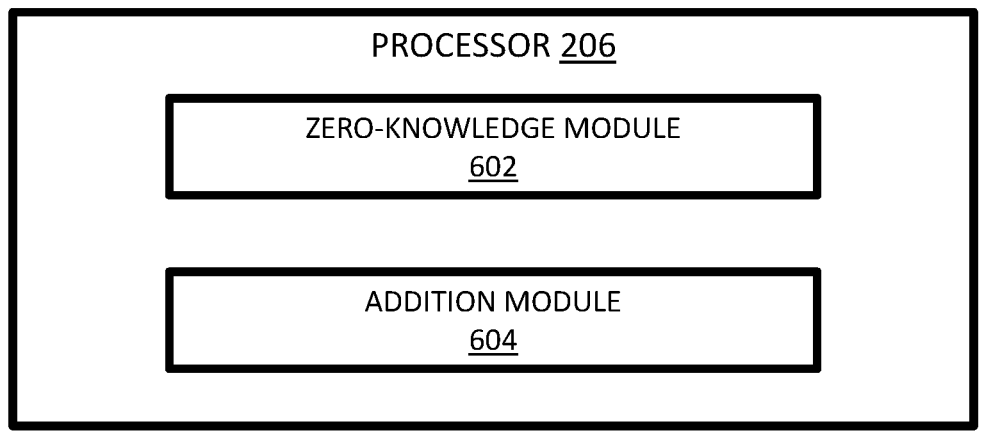
FIG. 6 is a schematic block diagram illustrating one embodiment of a processor included in the host computing devices of FIGS. 2A and 2B.

With reference to FIG. 6, FIG. 6 is a schematic block diagram of one embodiment of a processor 206, which can be one or more embodiments of processor 206A and/or processor 206B. At least in the illustrated embodiment, the processor 206 includes, among other components, a zero-knowledge module 602 and an addition module 604 similar to the zero-knowledge module 302 and addition module 304, respectively, in the memory device 204 discussed with reference to FIG. 3.

Figure 7:
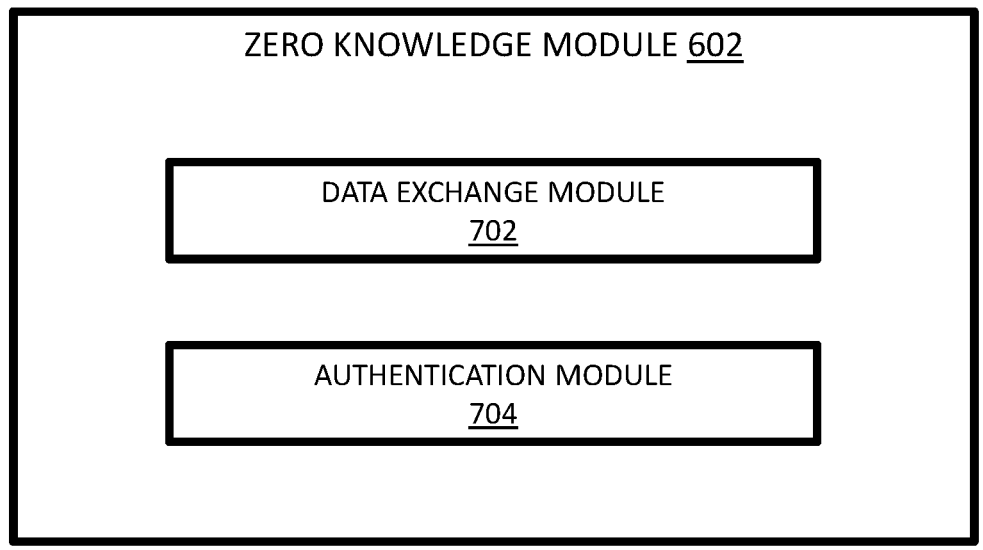
FIG. 7 is a schematic block diagram illustrating one embodiment of a zero-knowledge module included in the processor of FIG. 6.

Referring to FIG. 7, FIG. 7 is a schematic block diagram of one embodiment of a zero-knowledge module 602 included in the processor 206. At least in the illustrated embodiment, the zero-knowledge module 602 includes, among other components, a data exchange module 702 and an authentication module 704 similar to the data exchange module 402 and authentication module 404, respectively, discussed with reference to FIG. 4.

Figure 8:
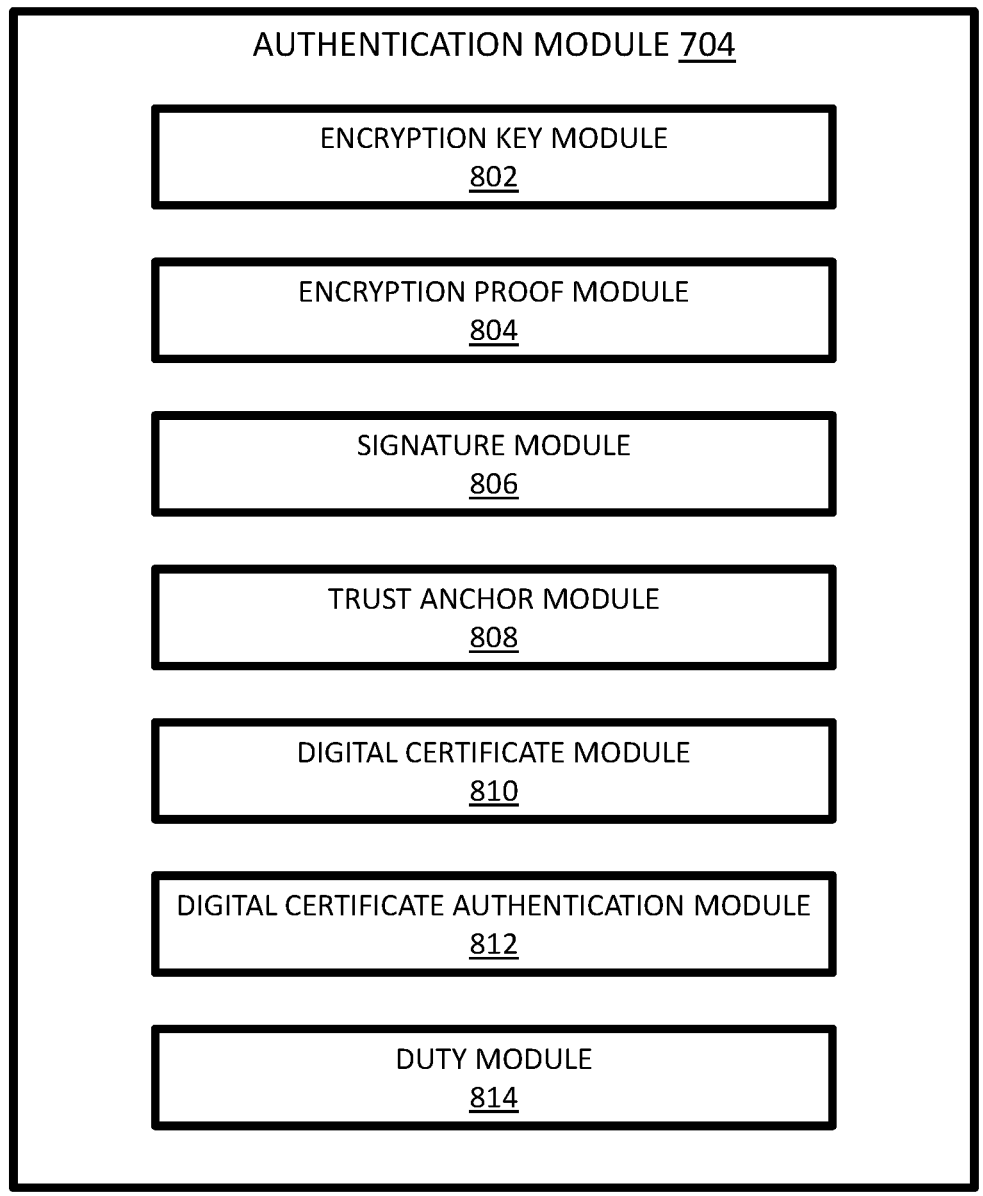
FIG. 8 is a schematic block diagram illustrating one embodiment of an authentication module included in the zero-knowledge module of FIG. 7.

With reference to FIG. 8, FIG. 8 is a schematic block diagram of one embodiment of an authentication module 704 included in the zero-knowledge module 602. At least in the illustrated embodiment, the authentication module 704 includes, among other components, an encryption key module 802, an encryption proof module 804, a signature module 806, a trust anchor module 808, a digital certificate module 810, a digital certificate authentication module 812, and a duty module 814 similar to the encryption key module 502, encryption proof module 504, signature module 506, trust anchor module 508, digital certificate module 510, digital certificate authentication module 512, and duty module 514, respectively, discussed with reference to FIG. 5.

Referring again to FIG. 1, one embodiment of the network 100 includes one or more information handling devices 104, each of which has at some point in time been added to the network 100 by a host computing device 102, as discussed herein. An information handling device 104 may include one or more of an Internet of Things (IoT) device, a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, etc., among other devices that are possible and contemplated herein.

In certain embodiments, the information handling devices 104 are communicatively coupled to one or more other information handling devices 104 and/or to one or more host computing devices 102 over a data network 106, as described herein. The information handling devices 102, in a further embodiment, may include processors, processor cores, and/or the like that are configured to execute various programs, program code, applications, instructions, functions, and/or the like. The information handling devices 104 may include executable code, functions, instructions, operating systems, and/or the like for presenting, displaying, and/or the like content such as multimedia content (e.g., videos, television, images, audio, text files, spreadsheets, slideshow presentations, and/or the like), streaming content (e.g., streaming video, audio, etc.), and/or the like.

In certain embodiments, the information handling devices 102 includes a set of IoT devices and the network 100 forms a mesh network. As used herein, a mesh network includes a network of physical devices (e.g., vehicles, home appliances, home electronics, and/or other items that are embedded with electronics, software, sensors, actuators, and connectivity) that enables the physical devices and/or objects to connect and exchange data. Some of the data that may be exchanged between the physical devices may include multimedia content, various types of files, and/or the like data.

In one embodiment, each information handling device 104 is configured to, at some point in time, attempt to join the network 100 (e.g., a mesh network). In various embodiments, each information handling device 104 may include a role and/or duty in the network 100.

Figure 9A:
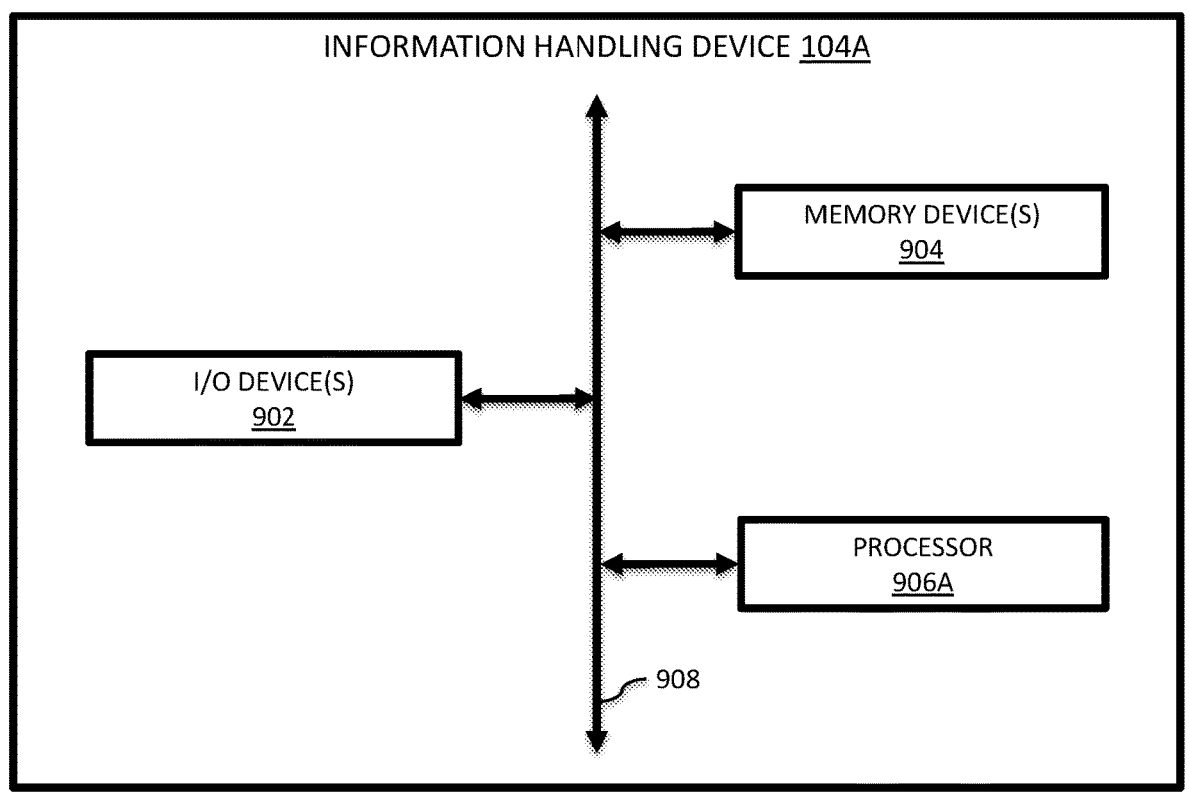
FIGS. 9A and 9B are schematic block diagrams illustrating various embodiments of an information handling device that can be added to the network of FIG. 1.

With reference to FIG. 9A, FIG. 9A is a block diagram of one embodiment of an information handling device 104A. At least in the illustrated embodiment, the information handling device 104A includes, among other components and/or features, one or more I/O devices 902, a set of memory devices 904 (or simply, memory 904), and a processor 906A coupled to and/or in communication with one another via a bus 908 (e.g., a wired and/or wireless bus).

Figure 9B:
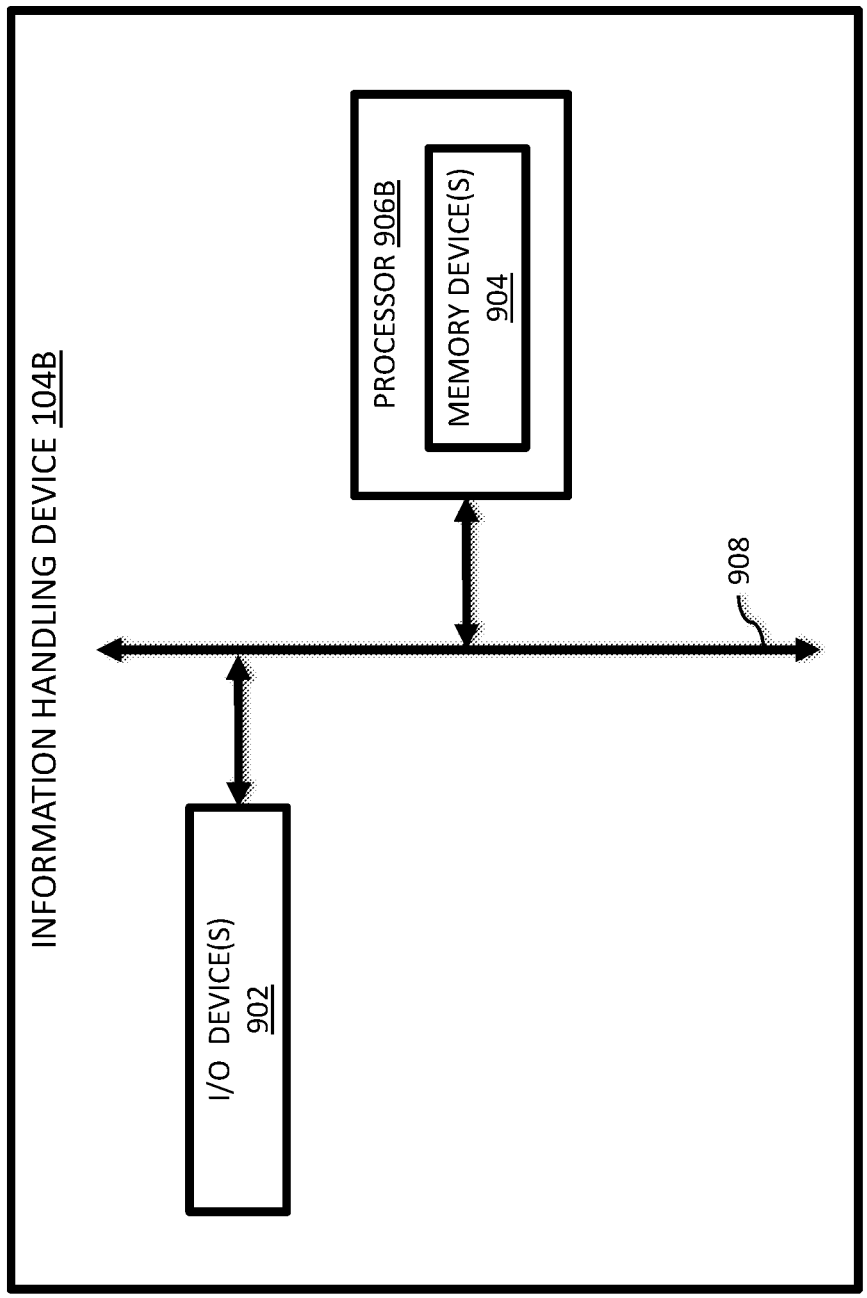

Referring to FIG. 9B, FIG. 9B is a block diagram of another embodiment of an information handling device 104B. At least in the illustrated embodiment, the information handling device 104B includes, among other components and/or features, one or more I/O devices 902, a set of memory devices 904, and a processor 906B coupled to and/or in communication with one another via a bus 908 similar to the I/O device(s) 902, memory device(s) 904, processor 906A, and bus 908 included in the information handling device 104A illustrated in FIG. 9A. A difference between the information handling device 104B and the information handling device 104A is that the memory device(s) 904 of the information handling device 104B are included in and/or form a portion of the processor 906B, whereas the memory device(s) 904 of the information handling device 104A are separate from and/or are device(s) that is/are independent from the processor 906A.

The information handling device 104A and the information handling device 104B may simply be referred to herein, individually and/or collectively, as information handling device(s) 104. In addition, the processor 906A and the processor 906B may simply be referred to herein, individually and/or collectively, as processor(s) 906.

In FIGS. 9A and 9B, an I/O device 902 may include any suitable system and/or device that is known or developed in the future capable of receiving inputs and transmitting outputs. That is, an I/O device 902 may include any suitable hardware and/or software that can enable and/or allow the information handling device 104 to communicate with one or more external computing devices over a communication network. In various embodiments, the I/O device 902 is configured to enable the information handling device 104 to communicate (e.g., transmit/receive data (exchange data), transmit/receive requests, and/or transmit/receive commands, etc.) with one or more other information handling devices 104 and/or one or more host computing devices 102 over one or more data networks 106.

A set of memory devices 904 may include any suitable quantity of memory devices 904. Further, a memory device 904 may include any suitable type of device and/or system that is known or developed in the future that can store computer-useable and/or computer-readable code. In various embodiments, a memory device 904 may include one or more non-transitory computer-usable mediums (e.g., readable, writable, etc.), which may include any non-transitory and/or persistent apparatus or device that can contain, store, communicate, propagate, and/or transport applications, instructions, data, computer programs, software, code, routines, etc., for processing by or in connection with a computer processing device (e.g., processor 906A and/or processor 906B).

A memory device 904, in some embodiments, includes volatile computer storage media. For example, a memory device 904 may include random access memory (RAM), including dynamic RAM (DRAM), synchronous dynamic RAM (SDRAM), and/or static RAM (SRAM). In other embodiments, a memory device 904 includes non-volatile computer storage media. For example, a memory device 904 may include flash memory and/or any other suitable non-volatile computer storage device that is known or developed in the future. In various embodiments, a memory device 904 includes both volatile and non-volatile computer storage media.

Figure 10:
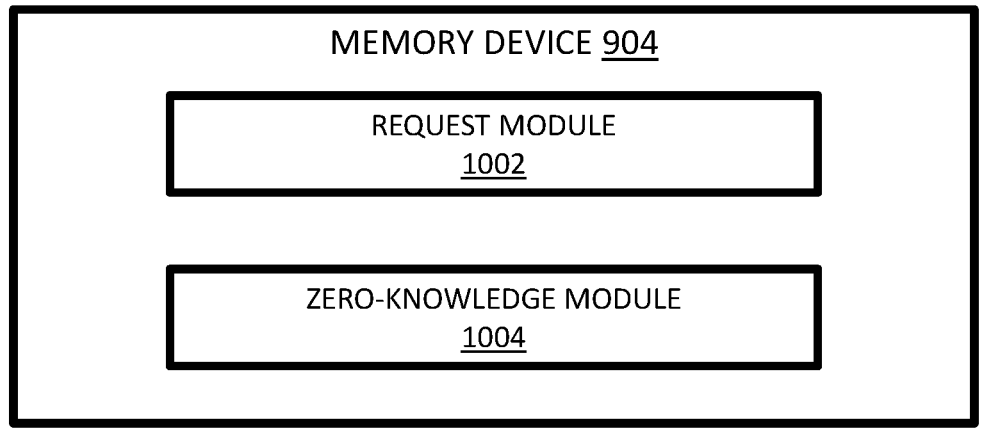
FIG. 10 is a schematic block diagram illustrating one embodiment of a memory device included in the information handling devices of FIGS. 9A and 9B.

With reference now to FIG. 10, FIG. 10 is a schematic block diagram of one embodiment of a memory device 904. At least in the illustrated embodiment, the memory device 904 includes, among other components and/or features, a request module 1001 and a zero-knowledge module 1004 that are each configured to operate/function in conjunction with one another when executed by a processor 906 to enable and/or allow an information handling device 104 to be added to a network via a zero-knowledge protocol.

Specifically, when executed by a processor 906, the request module 1002 and the zero-knowledge module 1004 can operate/function in conjunction with one another and a host computing device 102 and/or processor 206 to facilitate adding the information handling devices 104 to the network 100 via a zero-knowledge protocol. In various embodiments, the request module 1002 and the zero-knowledge module 1004 (via the zero-knowledge protocol) facilitate enabling and/or allowing an information handling device 104 to be added to the network 100 via the minimal amount of data, the predefined amount of data, and/or the predetermined amount of data exchanged between the information handling device 104 and/or processor 906 and the host computing device 102 and/or processor 206 when the information handling device 104 attempts to join the network 100.

A request module 1002 may include any suitable hardware and/or software that can generate a request to join the network 100 and/or add the information handling device 104 to the network 100. The request to join the network 100 may include any suitable data that can allow, enable, facilitate allowing, and/or facilitate enabling the information handling device 104 to be added to the network 100.

In various embodiments, the request includes data that can establish and/or facilitate establishing a digital trust relationship with a host computing device 102 and/or processor 206 via a zero-knowledge protocol. That is, the data in the request and/or the zero-knowledge protocol can establish and/or facilitate establishing a mutual digital trust relationship between the information handling device 104 (and/or processor 906) and a host computing device 102 (and/or a processor 206), as discussed elsewhere herein.

The request module 1002, in various embodiments, is configured to generate a request to join the network 100 that includes, among other data, components, and/or features, a device ID (e.g., an identifier of the information handling device 104 attempting to join the network 100), a first pair of public keys (e.g., first and second public keys), and a first pair of ZKPs corresponding to the first pair of public keys (e.g., proofs of the private encryption keys or private keys corresponding to the first public key and the second public key), etc., as discussed elsewhere herein. In various embodiments, the request module 1002 is configured to generate and/or locate and retrieve the device ID that uniquely identifies and/or represents the information handling device 104 and add the device ID for the information handling device 104 to the request to join the network 100.

The request module 1002 is configured to retrieve and/or receive the first pair of public keys (e.g., the first and second public keys) and the first pair of ZKPs corresponding to the first pair of public keys from the zero-knowledge module 1004. Further, the zero-knowledge module 1004 is configured to transmit the first pair of public keys and the first pair of ZKPs to the request module 1002 and/or facilitate retrieval of the first pair of public keys and the first pair of ZKPs by the request module 1002.

A zero-knowledge module 1004 may include any suitable hardware and/or software that can function, assist, and/or participate in a zero-knowledge protocol for adding the information handling device 104 to the network 100 and/or facilitate the implementation of a zero-knowledge protocol for adding the information handling device 104 to the network 100. In other words, a zero-knowledge module 1004 may include any suitable hardware and/or software that can function, assist, and/or participate in establishing, via the zero-knowledge protocol, a mutual digital trust relationship between the information handling device 104 (and/or processor 906) and a host computing device 102 (and/or processor 206) and/or facilitate establishing a mutual digital trust relationship between the information handling device 104 (and/or processor 906) and a host computing device 102 (and/or processor 206) when the information handling device 104 attempts to join the network and/or requests to join the network 100.

Figure 11:
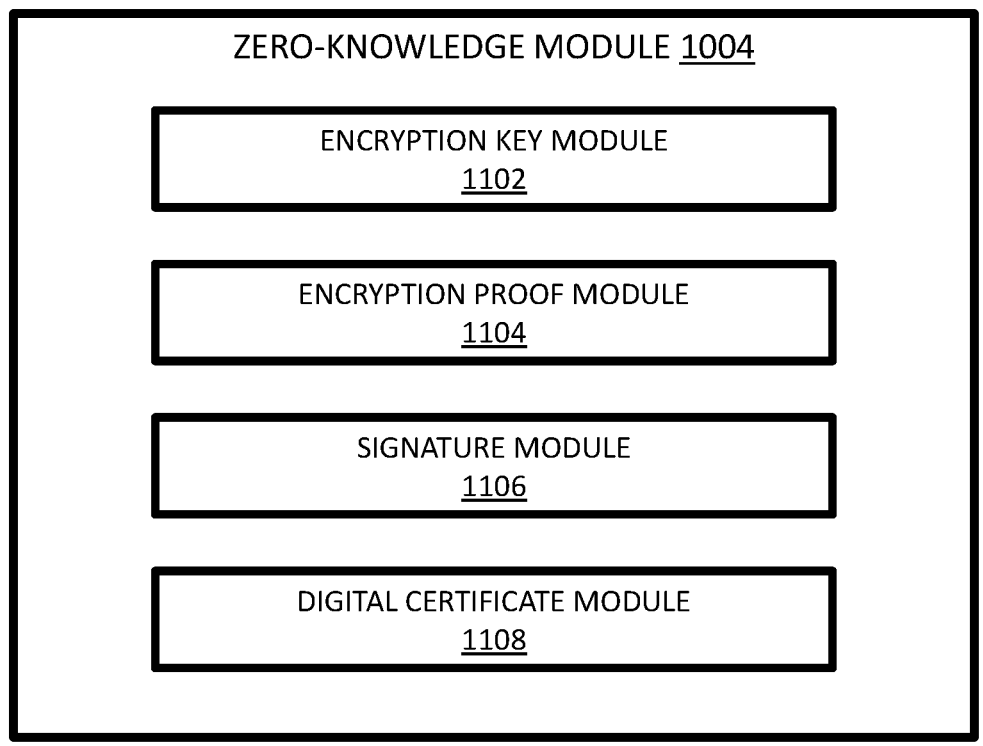
FIG. 11 is a schematic block diagram illustrating one embodiment of a zero-knowledge module included in the memory device of FIG. 10.

With reference to FIG. 11, FIG. 11 is a block diagram of one embodiment of a zero-knowledge module 1004. At least in the embodiment illustrated in FIG. 11, the zero-knowledge module 1004 includes, among other components and/or features, an encryption key module 1102, an encryption proof module 1104, a signature module 1106, and a digital certificate module 1108.

An encryption key module 1102 may include any suitable hardware and/or software that can generate one or more public encryption keys (or public keys). In various embodiments, the encryption key module 1102 is configured to generate a pair of public keys for inclusion in a request to join the network 100 generated by the request module 1002. That is, the encryption key module 1102 is configured to generate a first public key and a second public key when the information handling device 104 attempts to join the network 100. As discussed elsewhere herein, the first public key can be represented by $g^{x1}$, the second public key can be represented by $g^{x2}$, and the first pair of public keys can be represented as, $g^{x1}$, $g^{x2}$.

In various embodiments, the encryption key module 1102 is configured to generate the first public key $g^{x1}$ and the second public key $g^{x2}$ based on a group G of an ECC. In certain embodiments, the encryption key module 1102 is configured to generate the first public key $g^{x1}$ and the second public key $g^{x2}$ based on the generator "g" of a prime order "q." In various embodiments, the encryption key module 1102 can be configured to generate the first public key $g^{x1}$ and the second public key $g^{x2}$ based on a group G of an ECC that includes a difficult and/or complex discrete log problem and/or based on a Schnorr group G.

In various embodiments, the encryption key module 1102 is configured to randomly generate each of the first public key $g^{x1}$ and the second public key $g^{x2}$ such that the first pair of public keys $g^{x1}$, $g^{x2}$ are randomly selected points on an ECC and/or random ECC points. The encryption key module 1102 is configured to transmit the generated first pair of public keys $g^{x1}$, $g^{x2}$ to the encryption proof module 1104 and/or to the request module 1002 and/or facilitate retrieval of the first public key $g^{x1}$ and the second public key $g^{x2}$ by the request module 1002. Further, the encryption proof module 1104 is configured to receive the first pair of public keys $g^{x1}$, $g^{x2}$ from the encryption key module 1102.

An encryption proof module 1104 may include any suitable hardware and/or software that can generate one or more encryption proofs for inclusion in a request to join the network 100. In various embodiments, the encryption proof module 1104 is configured to generate a pair of encryption proofs (e.g., the first pair of encryption proofs) for inclusion in a request to join the network 100. That is, the encryption proof module 1104 is configured to generate the first encryption proof ZKP (X1) and the second encryption proof ZKP (X2) when the information handling device 104 is attempting to join the network 100.

As discussed elsewhere herein, the ZKPs generated for the first and second public keys $g^{x1}$, $g^{x2}$ may include any suitable ZKP and/or type of ZKP that is/are known or developed in the future. In certain embodiments, the ZKP (X1) and the ZKP (X2) include Schnorr Zero-Knowledge Proofs. ZKP (X1) and ZKP (X2) can notify the host computing device 102 and/or processor 206 that the information handling device 104 and/or processor 906 knows the respective values of the first pair of public keys ($g^{x1}$, $g^{x2}$). In various embodiments, the encryption proof module 1104 is configured to generate ZKP (X1) and ZKP (X2) based on the respective randomly selected values for the first pair of public keys $g^{x1}$, $g^{x2}$.

In certain embodiments, the first pair of ZKPs includes the secret S, as discussed elsewhere herein. That is, the encryption proof module 1104 is configured to determine a time t and/or calculate a value s. The encryption proof module 1104 is configured to generate the secret S to include the time t (e.g., a timestamp, etc.) and/or value s (e.g., a personal identification number (PIN), a bar code, a QR code, integer value, prime number value, etc.), as discussed elsewhere herein.

In various embodiments, the encryption proof module 1104 is configured to generate the secret S as a variable length character string including a subset of internationally recognized characters from the UTF-8 character set that includes a non-zero value (e.g., n≠0). In certain embodiments, the encryption proof module 1104 is configured to calculate the secret S as, S=int(<secret>) mod n, in which the <secret> includes, among other values, the value for time t and/or the value s.

The encryption proof module 1104 is configured to transmit the first ZKP (X1) and the second ZKP (X2) to the request module 1002 and/or facilitate retrieval of the first ZKP (X1) and the second ZKP (X2) by the request module 1002. In some embodiments, the encryption proof module 1104 is configured to forward the first public key $g^{x1}$ and the second public key $g^{x2}$ to the request module 1002 and/or facilitate retrieval of the first public key $g^{x1}$ and the second public key $g^{x2}$ by the request module 1002.

The zero-knowledge module 1004 is configured to receive, at the signature module 1106, the network ID for the network 100 that the information handling device 104 is attempting to join, the second pair of public keys (e.g., third public key $g^{x3}$ and fourth public key $g^{x4}$), the second pair of ZKPs (e.g., the third ZKP (X3) and the fourth ZKP (X4)), and the secret S from the host computing device 102 and/or processor 206. The zero-knowledge module 1004 is configured to generate first authentication data to mutually verify the host computing device 102, processor 206, and/or the network 100 in response to receiving the network ID, the second pair of public keys, the second pair of ZKPs, and the secret S.

The first authentication data includes, among other data and/or features, a first public key generator, a fifth ZKP associated with and/or corresponding to the first public key generator, and the secret S from the host computing device 102. That is, the first authentication data is based on the first pair of public keys ($g^{x1}$, $g^{x2}$), the second pair of public keys ($g^{x3}$, $g^{x3}$) the second pair of ZKPs (ZKP (X3), ZKP (X4)), and the secret S.

The first public key generator in the first authentication data may include any suitable public key and/or type of public key that is known or developed in the future. A first public key generator is generated based on the pairs of public keys, the pairs of ZKPs, and the secret S exchanged between the information handling device 104 and the host computing device 102 and/or processor 206. In various embodiments, the signature module 1102 is configured to generate the first public key generator based on the first public key $g^{x1}$, the third public key $g^{x3}$, and the fourth public key $g^{x4}$ (e.g., $g^{(x1+x3+x4)}$).

The signature module 1106 is further configured to generate the fifth ZKP. In certain embodiments, the fifth ZKP is based on a private key (e.g., private key $g^{X2}$) associated with/corresponding to the second public key $g^{x2}$ and the secret S included in the second pair of ZKPs that was previously received from the host computing device 102 and/or processor 206. The fifth ZKP is based on the private key associated with/corresponding to the second public key $g^{x2}$ (e.g., private key $g^{x2}$ ($g^{X2}$=x2*S mod n)), and the secret S included in the second pair of ZKPs (ZKP (X3) and ZKP (X4).

In various embodiments, the signature module 1106 is configured to generate the fifth ZKP by assigning a random integer in the range 1 to n−1 to an ephemeral private key v'. An ephemeral public key associated with an ephemeral private key v' (e.g., $g^{X2}$) is generated and assigned to V' in which V'=G*v'. An integer representation of a hash is generated and assigned to H. In some embodiments the hash H' can be calculated as, H'=int(SHA-256(G, V', X2, ID, S)) mod n.

Thus, various embodiments of the signature module 1106 are configured to generate the first authentication data as, A=$g^{(x1+x3+x4)x2S}$, in which $g^{(x1+x3+x4)}$ is the first public key generator and the fifth ZKP is the proof for the exponent x2S. The signature module 1106 is further configured to transmit the first authentication data to the host computing device 102 and/or processor 206.

The signature module 1106, in various embodiments, is further configured to receive second authentication data from the host computing device 102 and/or processor 206. As previously discussed, the second authentication data includes, among other data and/or features, a second public key generator, a sixth ZKP associated with and/or corresponding to the second public key generator, and the secret S. The second authentication data is, for example, B=$g^{(x1+x2+x3)x4S}$ in which $g^{(x1+x2+x3)}$ is the second public key generator and the sixth ZKP is the proof for the exponent x4S.

The signature module 1106, in various embodiments, is configured to derive a first public session key using the second authentication data. In certain embodiments, the signature module 1106 is configured to compute the keying material k1 as, k1=(B/$g^{x2x4S}$)$^{x2}$=($g^{(x1+x2+x3)x4S}$/$g^{x2x4S}$)$^{x2}$=$g^{(x1+x3)x2x4S}$. Notably, the keying material k1 computed by the information handling device 104 and/or processor 906 matches the keying material k2 computed by the host computing device 102 and/or processor 206.

Further, the signature module 1106 is configured to derive the first digital signature r1 using a cryptographic hash function K1=H(H(K)), in which H(H(K)) represents the first digital signature r1 and K1 represents the first public session key. In some embodiments, the first digital signature r1 can be calculated as, r1=H(v−x*H mod n). The signature module 1106 can transmit the first digital signature r1, H(H(K)), to the host computing device 104 and/or processor 206, which can be utilized for verification and/or validation purposes, as discussed elsewhere herein.

In some embodiments, the signature module 1106 can utilize the first digital signature r1, H(H(K)), to verify a second digital signature, H(K), received from the host computing device 102 and/or processor 206 via determining whether H(H(K)) and (H(K)) match. That is, a match verifies the second digital signature and a non-match fails to verify the second digital signature.

Specifically, an integer representation of a hash is generated and assigned to H in which H=int(SHA-256(G, V, X2, ID, t,s)) mod n. A check point is generated and assigned to V in which V'=X2*h+G*r1. The points V' and V are compared. If the points V' and V are equal, the signature module 1106 verifies the second digital signature r2. If the points V' and V are not equal, the signature module 1106 fails to verify the second digital signature r2.

In additional or alternative embodiments, the signature module 1106 can utilize the first public session key K1 to verify a second public session key K2 received from the host computing device 102 and/or processor 206 via determining whether the first public session key K1 and the second public session key K2 match. That is, a match verifies the second digital signature r2 and a non-match fails to verify the second digital signature r2.

The signature module 1106 is configured to withdraw a request to join the network 100 in response to failing to verify the second digital signature r2. Further, the signature module 1106 is configured to transmit the withdrawal of the request to join the network 100 to the host computing device 102 and/or the processor 206.

A digital certificate module 1108 may include any suitable hardware and/or software that can receive digital certificates from the host computing device 102 and/or processor 206. In various embodiments, the digital certificate module 1108 is configured to receive a trust anchor and a new/different digital certificate from the host computing device 102 and/or processor 206.

In various embodiments, the trust anchor includes a root certificate generated by the host computing device 102 and/or processor 206, as discussed elsewhere herein. Further, the new/different digital certificate received from the host computing device 102 and/or processor 206 can include a new and/or different x.509 certificate for the information handling device 104 that is generated by the host computing device 102 and/or processor 206, as discussed above. The digital certificate module 1108 can transmit the new and/or different digital certificate (e.g., a new/different x.509 certificate) to the host computing device 102 and/or processor 206 for verification and/or validation purposes, as further discussed above.

In addition, the information handling device 104 and/or processor 906 can receive a notification of the assigned role and/or duty that the information handling device 104 and/or processor 906 will perform upon being added to the network 100. Further, the information handling device 104 and/or processor 906 are configured to perform the assigned role and/or duty after being added to the network 100.

Referring again to FIGS. 9A and 9B, a processor 906 may include any suitable non-volatile/persistent hardware and/or software configured to perform and/or facilitate performing functions and/or operations for adding devices to a network via a zero-knowledge protocol. In various embodiments, the processor 906 includes hardware and/or software for executing instructions in one or more modules and/or applications that can perform and/or facilitate adding devices to a network via a zero-knowledge protocol. The modules and/or applications executed by the processor 906 for adding devices to a network via a zero-knowledge protocol can be stored on and executed from a memory device 904 and/or from the processor 906.

Figure 12:
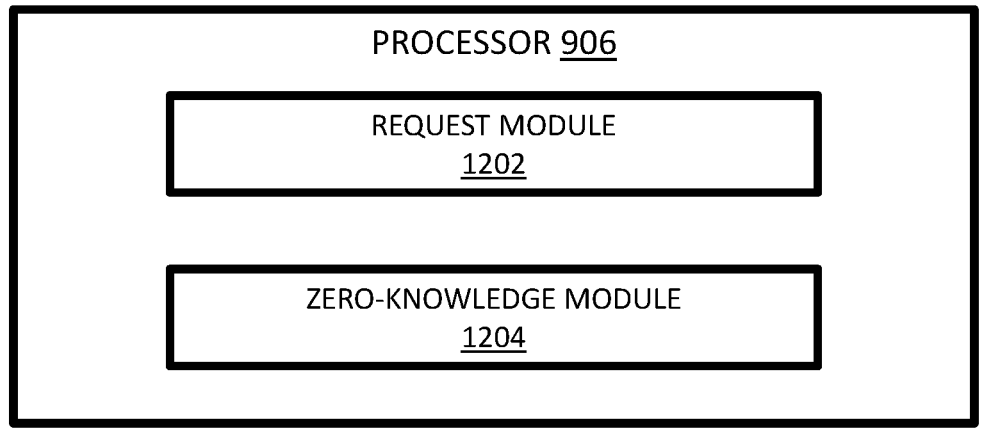
FIG. 12 is a schematic block diagram illustrating one embodiment of a processor included in the information handling devices of FIGS. 9A and 9B.

With reference to FIG. 12, FIG. 12 is a schematic block diagram of one embodiment of a processor 906, which can be one or more embodiments of processor 906A and/or processor 906B. At least in the illustrated embodiment, the processor 906 includes, among other components, a request module 1202 and a zero-knowledge module 1204 similar to the request module 1002 and the zero-knowledge module 1004, respectively, in the memory device 904 discussed with reference to FIG. 10.

Figure 13:
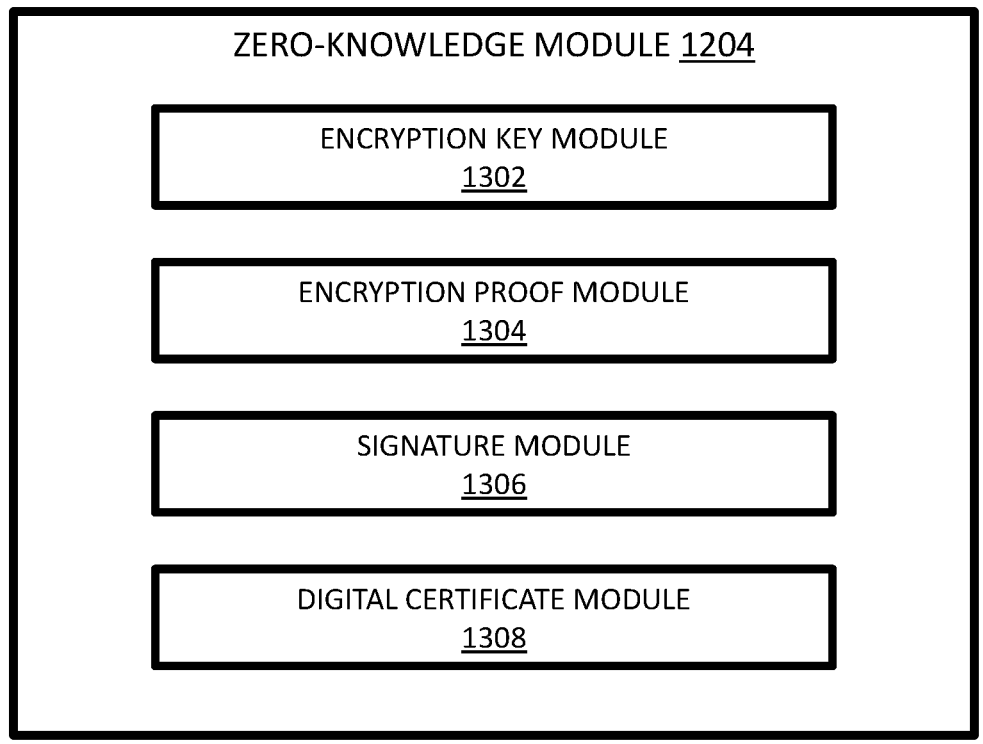
FIG. 13 is a schematic block diagram illustrating one embodiment of a zero-knowledge module included in the processor of FIG. 12.

Referring to FIG. 13, FIG. 13 is a schematic block diagram of one embodiment of a zero-knowledge module 1204 included in the processor 906. At least in the illustrated embodiment, the zero-knowledge module 1204 includes, among other components, an encryption key module 1302, an encryption proof module 1304, a signature module 1306, and a digital certificate module 1308 similar to the encryption key module 1102, encryption proof module 1104, signature module 1106, and digital certificate module 1108, respectively, discussed with reference to FIG. 11.

Figure 14:
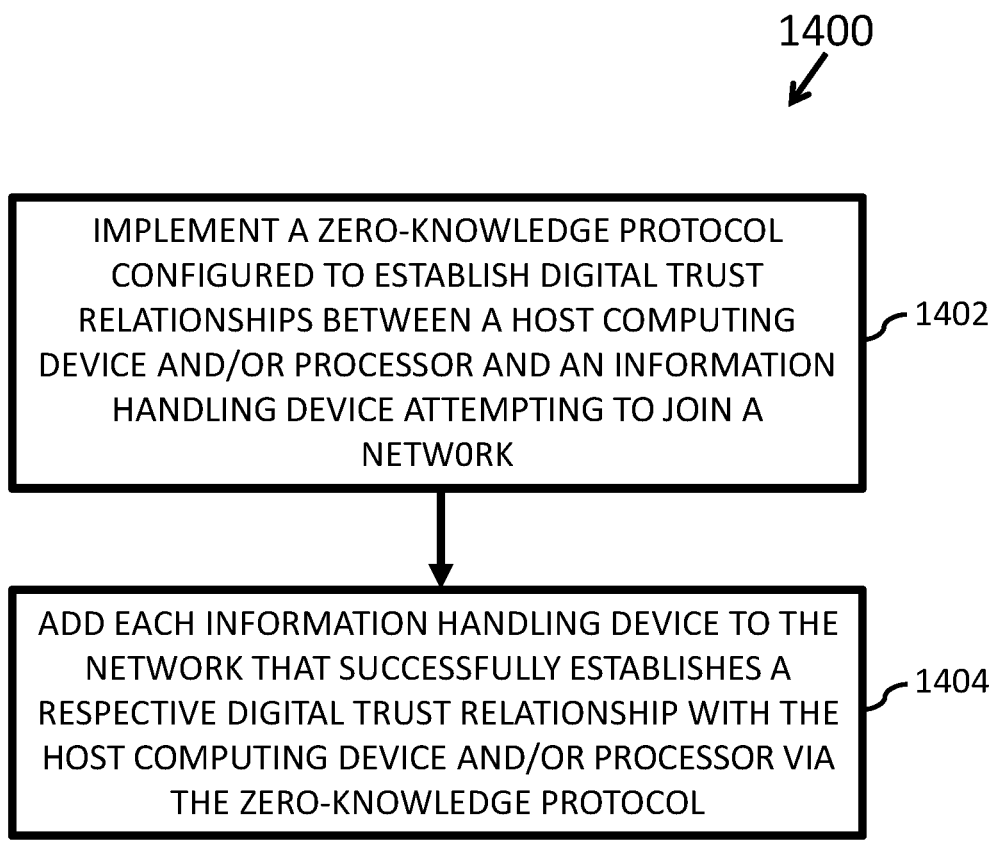
FIG. 14 is a schematic flow chart diagram illustrating one embodiment of a method for adding devices to a network via a zero-knowledge protocol.

FIG. 14 is a schematic flow chart diagram illustrating one embodiment of a method 1400 for adding devices to a network via a zero-knowledge protocol. At least in the embodiment illustrated in FIG. 14, the method 1400 begins by a processor (e.g., processor 206) implementing a zero-knowledge protocol (block 1402). In certain embodiments, the zero-knowledge protocol is capable of establishing a respective digital trust relationship between a host computing device 102 and/or the processor 206 and each respective information handling device 104 (e.g., a computing device, IoT device, etc.) attempting to join a network 100.

The processor 206 adds each respective information handling device 104 to the network 100 that successfully establishes a respective digital trust relationship between the host computing device 102 and/or the processor 206 and an information handling device 104 (block 1404). That is, an information handling device 104 is added to the network in response to a digital trust relationship being established between the host computing device 102 and/or the processor 206 and the information handling device 104.

In various embodiments, successfully establishing the respective digital trust relationship with the host computing device 102 and/or processor 206 via the zero-knowledge protocol includes generating a respective new digital certificate for each respective an information handling device 104 attempting to join the network 100 based on authentication data exchanged between the host computing device 102 and/or processor 206 and each respective an information handling device 104. In additional or alternative embodiments, each respective an information handling device 104 is added to the network 100 in response to validating each respective new digital certificate corresponding to each respective an information handling device 104 attempting to join the network 100.

In certain embodiments, establishing the digital trust relationships with the host computing device 102 and/or processor 206 via the zero-knowledge protocol is based exchanging a minimal amount of common knowledge data between the host computing device 102 and/or processor 206 and each respective an information handling device 104 attempting to join the network 100. In additional or alternative embodiments, successfully establishing each respective digital trust relationship with each respective an information handling device 104 via the zero-knowledge protocol includes mutually authenticating the host computing device 102 and/or processor 206 and each respective an information handling device 104 attempting to join the network 100.

Embodiments may be practiced in other specific forms. The described embodiments are to be considered in all respects only as illustrative and not restrictive. The scope of the subject matter disclosed herein is, therefore, indicated by the appended claims rather than by the foregoing description. All changes which come within the meaning and range of equivalency of the claims are to be embraced within their scope.

What is claimed is:

1. An apparatus, comprising:
  a processor; and
  a memory configured to store code executable by the processor to:
    implement a zero-knowledge protocol configured to establish digital trust relationships between the apparatus and computing devices attempting to join a network, receive, from each computing device attempting to join the network, a respective identifier, a pair of public keys, and a pair of zero-knowledge proofs (ZKPs) corresponding to the pair of public keys, wherein:

each pair of ZKPs comprises a respective shared secret(S) between the apparatus and each respective computing device attempting to join the network, each shared secret(S) is defined by the calculation S=int (<secret>) mod n in which S includes a variable length character string, n is a non-zero value, and the secret includes a time t defined by a timestamp, and each shared secret(S) is private between the apparatus and a particular computing device attempting to join the network and is not shared over the network, and add each computing device to the network as a digitally trusted computing device in response to each respective computing device successfully establishing a respective digital trust relationship with the apparatus via using each respective identifier, pair of public keys, and pair of ZKPs within the zero-knowledge protocol to authenticate each respective computing device.

2. The apparatus of claim 1, wherein:

successfully establishing the respective digital trust relationship with the processor via the zero-knowledge protocol comprises the processor generating a respective new digital certificate for each respective computing device attempting to join the network based on authentication data exchanged between the processor and each respective computing device; and the processor is configured to add each respective computing device to the network responsive to the processor validating each respective new digital certificate corresponding to each respective computing device attempting to join the network.

3. The apparatus of claim 1, wherein establishing the digital trust relationships with the processor via the zero-knowledge protocol is based on the processor exchanging a minimal amount of common knowledge data with each respective computing device attempting to join the network.

4. The apparatus of claim 1, wherein establishing the digital trust relationships with the processor via the zero-knowledge protocol is based on the processor exchanging a predetermined amount of common knowledge data with each respective computing device attempting to join the network.

5. The apparatus of claim 1, wherein establishing the digital trust relationships with the processor via the zero-knowledge protocol is based on the processor exchanging a predetermined minimal amount of common knowledge data with each respective computing device attempting to join the network.

6. The apparatus of claim 1, wherein successfully establishing each respective digital trust relationship with each respective computing device via the zero-knowledge protocol comprises the processor mutually authenticating each respective computing device attempting to join the network.

7. The apparatus of claim 6, wherein mutually authenticating each respective computing device comprises the processor exchanging with each respective computing device, respective pairs of public keys generated from random elliptic curve cryptography (ECC) points and exchanging respective pairs of Schnorr ZKPs corresponding to the respective pairs of public keys.

8. The apparatus of claim 7, wherein the respective pairs of ZKPs include synchronized time and secret properties.

9. The apparatus of claim 8, wherein, in mutually authenticating each respective computing device, the processor is configured to:

receive a Zero-Knowledge signature from a computing device, wherein the received Zero-Knowledge signature is based on the exchanged pairs of public keys, the exchanged pairs of ZKPs, and the synchronized time and secret properties; and verify the received Zero-Knowledge signature for the computing device.

10. The apparatus of claim 9, wherein, in mutually authenticating each respective computing device via the zero-knowledge protocol, the processor is further configured to establish a trust anchor with the computing device based on verifying the received Zero-Knowledge signature for the computing device.

11. The apparatus of claim 10, wherein the processor is further configured to:

utilize the established trust anchor to generate a new digital certificate for the computing device; and authenticate the computing device via the new digital certificate.

12. The apparatus of claim 11, wherein the new digital certificate authenticates the computing device for a particular role in the network.

13. A method, comprising:

implementing, by a processor, a zero-knowledge protocol configured to establish digital trust relationships between the processor and computing devices attempting to join a network;

receiving, from each computing device attempting to join the network, a respective identifier, a pair of public keys, and a pair of zero-knowledge proofs (ZKPs) corresponding to the pair of public keys, wherein:

each pair of ZKPs comprises a respective shared secret(S) between the apparatus and each respective computing device attempting to join the network, each shared secret(S) is defined by the calculation S=int(<secret>) mod n in which S includes a variable length character string, n is a non-zero value, and the secret includes a time t defined by a timestamp, and each shared secret(S) is private between the apparatus and a particular computing device attempting to join the network and is not shared over the network; and adding each computing device to the network as a digitally trusted computing device in response to each respective computing device successfully establishing a respective digital trust relationship with the processor via using each respective identifier, pair of public keys, and pair of ZKPs within the zero-knowledge protocol to authenticate each respective computing device.

14. The method of claim 13, wherein:

successfully establishing the respective digital trust relationship with the processor via the zero-knowledge protocol comprises generating a respective new digital certificate for each respective computing device attempting to join the network based on authentication data exchanged between the processor and each respective computing device; and each respective computing device is added to the network responsive to validating each respective new digital certificate corresponding to each respective computing device attempting to join the network.

15. The method of claim 13, wherein establishing the digital trust relationships with the processor via the zero-knowledge protocol is based exchanging a minimal amount of common knowledge data between the processor and each respective computing device attempting to join the network.

16. The method of claim 13, wherein successfully establishing each respective digital trust relationship with each respective computing device via the zero-knowledge protocol comprises mutually authenticating the processor and each respective computing device attempting to join the network.

17. A computer program product comprising a non-transitory computer-readable storage device including code embodied therewith, the code executable by a processor to cause the processor to:
- implement a zero-knowledge protocol configured to establish digital trust relationships between the processor and computing devices attempting to join a network;
- receive, from each computing device attempting to join the network, a respective identifier, a pair of public keys, and a pair of zero-knowledge proofs (ZKPs) corresponding to the pair of public keys, wherein:
  - each pair of ZKPs comprises a respective shared secret(S) between the apparatus and each respective computing device attempting to join the network,
  - each shared secret(S) is defined by the calculation S=int(<secret>) mod n in which S includes a variable length character string, n is a non-zero value, and the secret includes a time t defined by a timestamp, and
  - each shared secret(S) is private between the apparatus and a particular computing device attempting to join the network and is not shared over the network; and
- add each computing device to the network as a digitally trusted computing device in response to each respective computing device successfully establishing a respective digital trust relationship with the processor via using each respective identifier, pair of public keys, and pair of ZKPs within the zero-knowledge protocol to authenticate each respective computing device.

18. The computer program product of claim 17, wherein:
- the code to successfully establish the respective digital trust relationship with the processor via the zero-knowledge protocol comprises code that causes the processor to generate a respective new digital certificate for each respective computing device attempting to join the network based on authentication data exchanged between the processor and each respective computing device; and
- the code that adds each respective computing device to the network comprises code that causes the processor to add each respective computing device to the network responsive to the processor validating each respective new digital certificate corresponding to each respective computing device attempting to join the network.

19. The computer program product of claim 17, wherein the code to establish the digital trust relationships with the processor via the zero-knowledge protocol comprises code that causes the processor to exchange a minimal amount of common knowledge data between the processor and each respective computing device attempting to join the network.

20. The computer program product of claim 17, wherein the code to successfully establish each respective digital trust relationship with each respective computing device via the zero-knowledge protocol comprises code that causes the processor to mutually authenticate each respective computing device attempting to join the network.

* * * * *